United States Patent [19]

Mizoguchi et al.

[11] Patent Number: 4,926,196

[45] Date of Patent: May 15, 1990

[54] INK JET PRINTER

[75] Inventors: Yoshiyuki Mizoguchi, Yokohama; Yoshitaka Watanabe; Hiroyuki Hiraga, both of Tokyo; Shigeru Fukuyama, Yokohama, all of Japan

[73] Assignee: Canon Kabushiki Kaisha, Tokyo, Japan

[21] Appl. No.: 135,439

[22] Filed: Dec. 21, 1987

[30] Foreign Application Priority Data

Dec. 25, 1986 [JP] Japan ................................ 61-307907
Feb. 2, 1987 [JP] Japan ................................ 62-020561

[51] Int. Cl.[5] .......................... G01D 15/16; B41J 3/04
[52] U.S. Cl. ................................................ 346/140 R
[58] Field of Search .......................................... 346/140

[56] References Cited

U.S. PATENT DOCUMENTS 4,410,900 10/1983 Terasawa .
4,628,333 12/1986 Terasawa ........................ 346/140 R
4,692,777 9/1987 Hasumi ................................ 346/140
4,695,851 9/1987 Terasawa ............................ 346/140

FOREIGN PATENT DOCUMENTS 56-113464 7/1981 Japan .
59-199254 11/1984 Japan .
60-159057 8/1985 Japan .

*Primary Examiner*—Joseph W. Hartary
*Attorney, Agent, or Firm*—Fitzpatrick, Cella, Harper & Scinto

[57] ABSTRACT

An ink jet printer has a recovery system for sucking ink from nozzle orifices together with air bubbles stagnant in orifices so as to recover the normal state in the orifices. The recovery system has a vacuum generating device, a capping device and a valve mechanism for controlling the vacuum generated in the vacuum generating device to the capping device. The recovery system further has a temperature detector for detecting the temperature of the ink. The operation timing of the valve mechanism is controlled in accordance with the temperature of the ink detected by the temperature detecting means, so that the amount of ink sucked by the recovery system is regulated in accordance with the temperature of the ink.

12 Claims, 18 Drawing Sheets

INK JET PRINTER

BACKGROUND OF THE INVENTION

1. Field of the Invention

The present invention relates to an ink jet printer which discharges ink onto a recording medium thereby recording information on the recording medium.

2. Related Background Art

In general, presence of voids or air bubbles in the ink within orifices of ink jet head of an ink jet printer deteriorates the image reproducibility of the printer by allowing white blanks to be formed in the printed characters. In order to eliminate this problem, ink jet printers are usually provided with a suction recovery system which induces stagnant air in the orifices.

The suction recovery system includes a vacuum pump which sucks, through a cap, air from each nozzle which is designed to discharge droplets of the ink.

In order to improve the precision of operation of the suction recovery system, the present applicant has proposed an improved system in which a valve mechanism is provided in the suction passage between the vacuum pump and the cap, as in Japanese Patent Application No. 159057/1985.

The viscosity of the ink used in ink jet printers changes in accordance with the temperature. More specifically, the ink exhibits a lower viscosity and, hence, a higher fluidity, as the ink temperature rises. Conversely, a reduction in the ink temperature increases the viscosity of the ink with the result that the ink becomes less fluid.

In consequence, an operation of the suction recovery system for inducing air when the ink temperature is high tends to cause an excessively large quantity of ink to be induced with the air, due to the reduced viscosity of the ink, even if a valve mechanism is provided in the suction passage.

Thus, from an economical point of view, the ink tends to be induced wastefully during operation of the recovery system.

SUMMARY OF THE INVENTION

Accordingly, an object of the present invention is to provide an ink jet printer capable of overcoming the abovedescribed problem of the prior art.

To this end, the invention provides an ink jet printer having a suction recovery system which is improved such that the suction power of the suction recovery system is suitably controlled in accordance with the ink temperature so as to eliminate excessive suction of the ink, thereby allowing economical use of the ink.

The above and other objects, features and advantages of the present invention will become clear from the following description of the preferred embodiments when the same is read in conjunction with the accompanying drawings.

BRIEF DESCRIPTION OF THE DRAWINGS

FIGS. 14A-1 and 14A-2 are a flow chart of an initial process from the commencement of supply of power unit a stand-by state;

FIGS. 14A-1 and 14A-2 are a flow chart illustrating the operation of a pump in a suction recovery system for recovering ordinary state of ink nozzle by removing, for example, any matter clogging the nozzle;

DESCRIPTION OF THE PREFERRED EMBODIMENTS

An embodiment of the ink jet printer of the present invention will be described in detail with reference to the accompanying drawings.

<Appearance>

Figure 1:
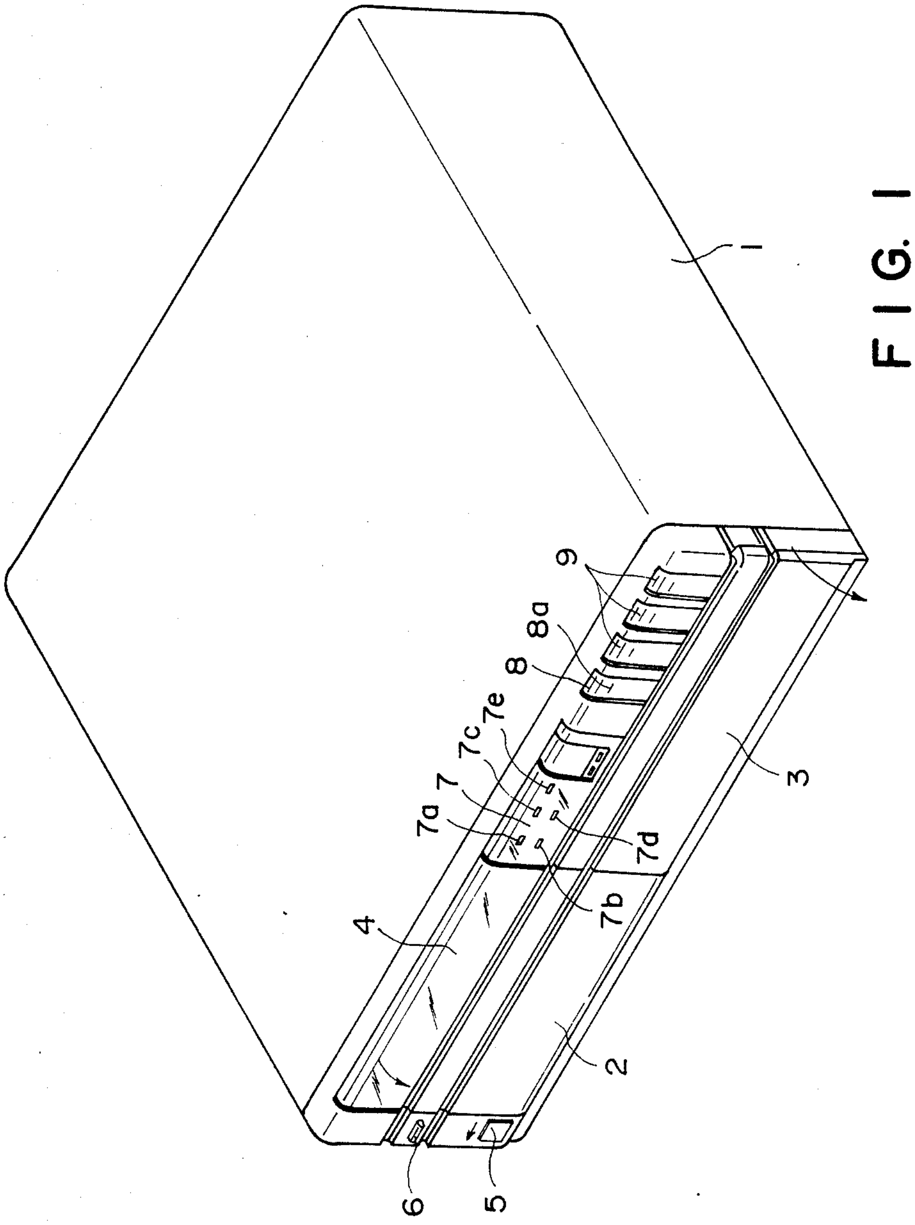
FIG. 1 a perspective view of a printer.
Figure 2:
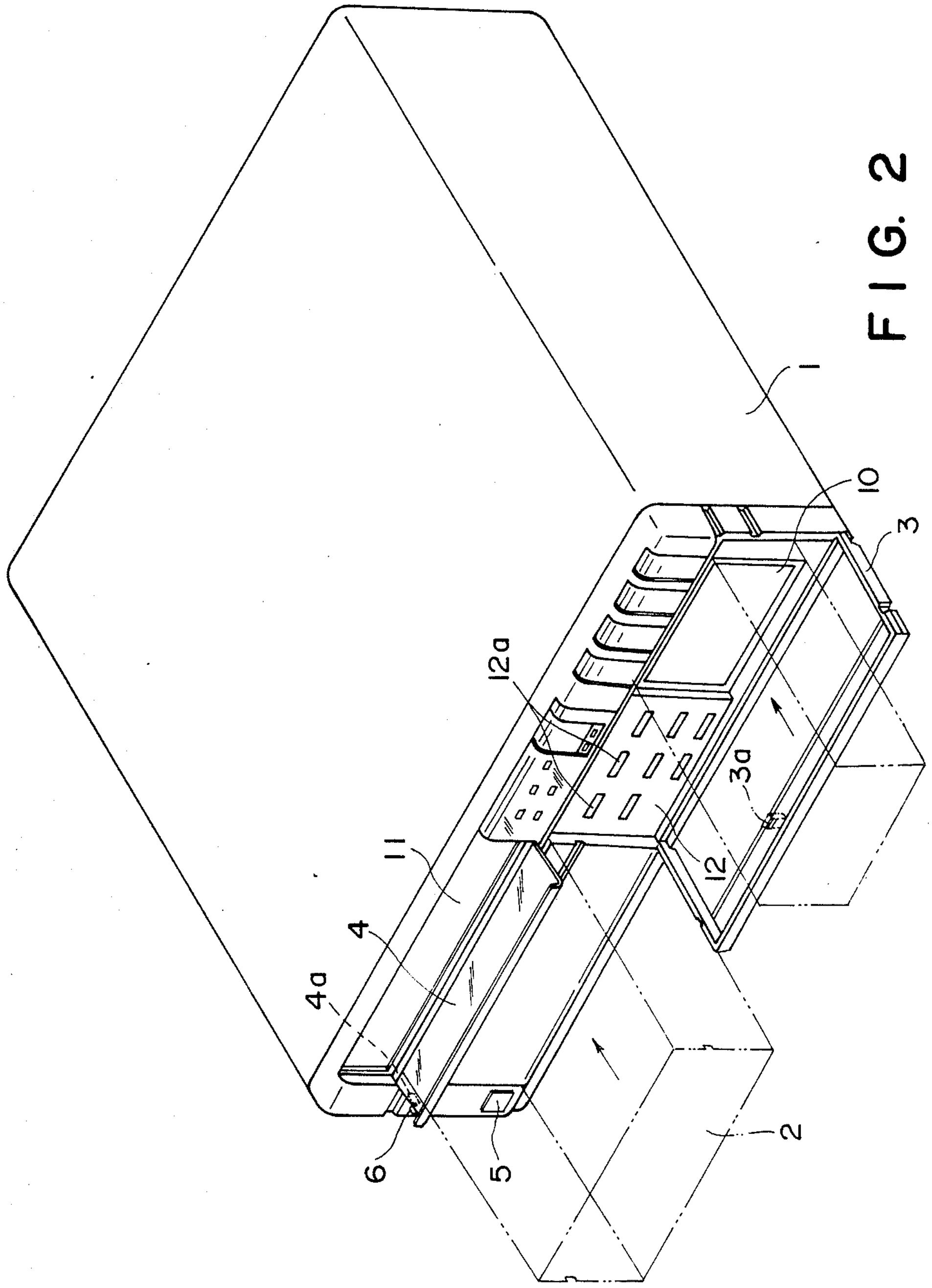
FIG. 2 is a perspective view of the printer shown in FIG. 1 with a decorative cover and a dust cover in held open positions.

FIGS. 1 and 2 are perspective views of the body of an ink jet printer embodying the present invention. A small-size cassette 2 is detachably mounted on the front side of the body 1 of the printer. A decorative cover 3 is hinged on the front side of the body 1 on the right side of the cassette 2. When the decorative cover 3 is opened as shown in FIG. 2, various parts of the printer such as an ink cartridge 10, an auxiliary operation switch system 12 and so forth are exposed to the outside. The decorative cover 3 has a claw 3*a* which is adapted for engagement with a notch (not shown) formed in the printer body so as to lock the cover 3 in the closing position. As the claw 3*a* is rotated in the direction of an arrow in FIG. 2, the cover 3 is unlocked to swing outward to the opening position shown in FIG. 2.

A dust cover 4 for a sheet feed opening 11 is provided in the front side of the body 1 of the cassette on the upper side of the cassette 2. This cover 4 is provided with a claw 4*a* so that it can be locked and unlocked in the same way as the decorative cover 3. The dust cover 4 is provided with a dust cover switch SW1 which will be explained later. The dust cover switch SW1 is adapted to produce a signal indicative of the state of the dust cover 4, i.e., whether the dust cover 4 is opened or closed.

A cassette mounting/demounting slide 5 is provided on the front side of the body 1 (on the left side of the cassette 2). The slide 5 will be described later. A power supply switch 6 is disposed on the upper side of the button 5.

A display device 7 is provided on the front side of the body 1 above the left end portion of the decorative cover 3. The display device 7 has a display section *7a* for displaying any abnormality in the sheet feed system, a display section *7b* for displaying any abnormality in the ink supply system, a display section *7c* for displaying a print position A, a display section *7d* for displaying a print position B, and a display section *7e* for displaying a print position C, all these display sections *7a* to *7e* being covered by a dust cover *7f*.

Main operation switches 8 and 9 are arranged on the upper right side of the decorative cover 3. A reference numeral 8 denotes a print switch which is provided with an LED *8a* which is lit when this switch has been pressed. Portions denoted by a numeral 9 are not described because they do not constitute any critical portion of the invention.

The ink cartridge 10 is adapted to be pressed in the direction of the arrow in FIG. 2 so as to be connected to an ink jet head IJU through, for example, a needle which is known per se, and is demountable by means of a lever which will be explained later. As shown in FIG. 2, the auxiliary operation switch system 12 has a switch *12a* for selecting the print position. Other switches are not described because they do not constitute any critical portion of the invention.

<Internal Layout>

Figure 3:
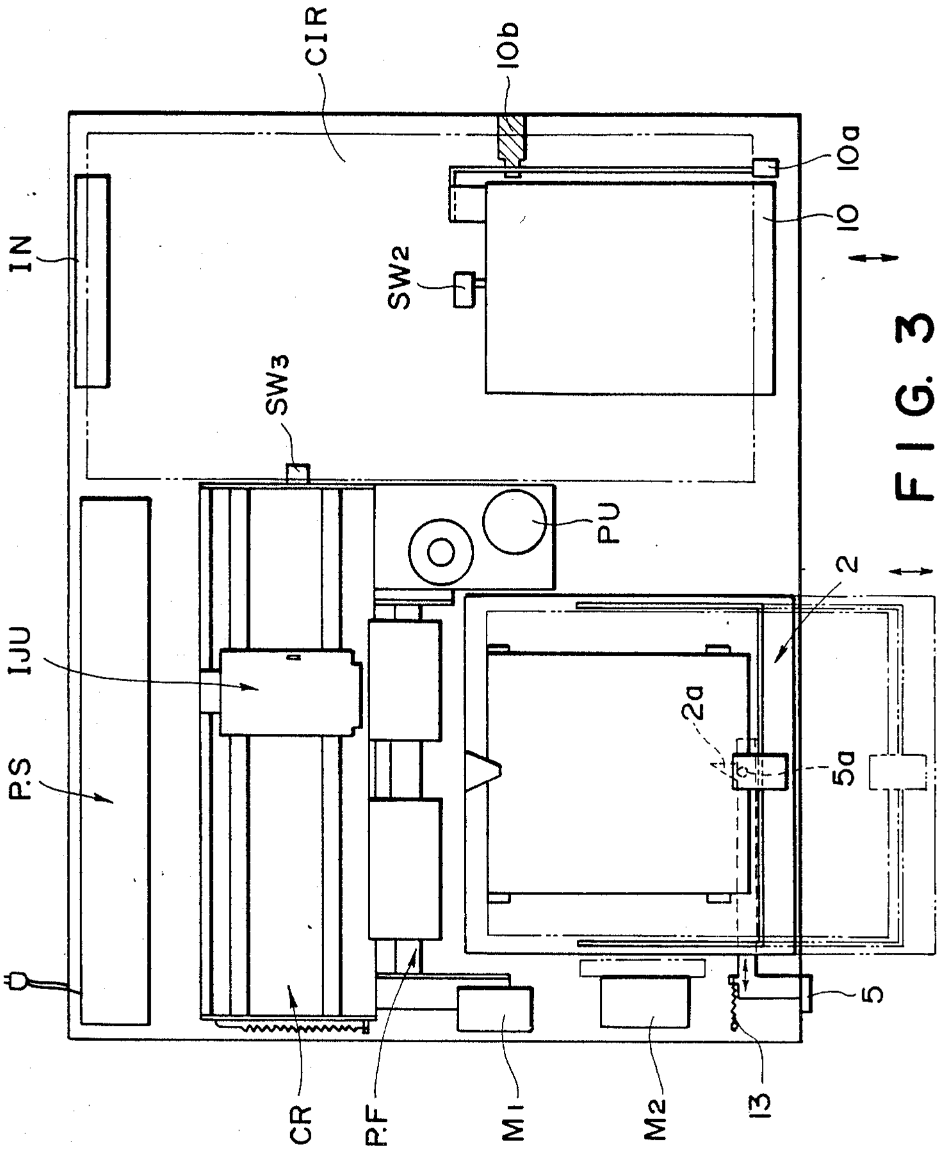
FIG. 3 is a schematic illustration of the internal structure printer.

FIG. 3 is a top plan view schematically showing the internal structure of the printer body 1.

A later-mentioned carriage system CR is disposed in the left portion of the printer body 1. The ink jet head IJU is adapted to perform main scan by the carriage system CR. A sheet feed system PF is disposed in front of the carriage CR. The sheet feed system PF is composed of a platen roller 22, a sheet feed roller 18, a sheet feed motor M2 and a sheet conveyor motor Ml.

A pump system PU is provided at the center of the space in the printer body 1. The pump system PU has a vacuum generating mechanism, a valve mechanism, a cap 4 and other members. As will be understood from FIGS. 2 and 3, the ink cartridge 10 is disposed at the right side in the printer body 1 and is situated such that its underside is flush with the underside of the printer body 1. Thus, the ink cartridge 10 is placed at a level below the ink jet head IJU such that a negative pressure is maintained in the end of the ink jet head IJU, thereby preventing the ink from dripping from the end of the ink jet head IJU.

A lever *10a* is mounted for rotation about a fulcrum *10b* provided at the right side of the printer body 1. The arrangement is such that the ink cartridge 10 can be mounted and demounted on and from the printer body 1 by swinging the lever *10a*. A switch SW2 for detecting presence of absence of the ink cartridge 10 is disposed behind the ink cartridge 10.

An electric circuit CIR, which is fixed to the printer body 1 by a known method, is disposed on the upper side of the cartridge 10. An input terminal IN exposed from the right rear portion of the printer body 1 is connected to the electric circuit CIR. A power supply PS is disposed in the rear left portion of the printer body 1.

The described arrangement of the electric system enables an economical use of the substrate and minimizes the influence of the heat from electric circuits on the ink cartridge 10 and the ink jet head IJU. The separate installation of the mechanical system and the electric system facilitates the assembly and maintenance.

The aforementioned slide 5 for mounting/demounting the cassette 2 has a substantially L-shaped form and is slidably mounted in the printer body 1 in such a manner that a portion thereof is exposed from the front side of the printer body 1. This slide 5 is urged inwardly by a spring 13 and is adapted to slide in the directions of arrows along a guide pin (not shown). The slide 5 has a portion which extends to a space under the center of the cassette 2. An upwardly projecting pin *5a* is provided on the extended end of the slide 5. A prism-shaped cam *2a* provided on the center of the underside of the cassette 2 is adapted to be retained by the pin *5a*. The cam *2a* and the pin *5a* in combination constitute a locking mechanism for locking the cassette 2. In FIG. 3, a two-dot-and-dash line diagrammatically shows a large-size cassette mounted in the printer.

<Pump System PU>

A pump system PU will be described hereinunder with reference to FIGS. 4 to 12.

Figure 4:
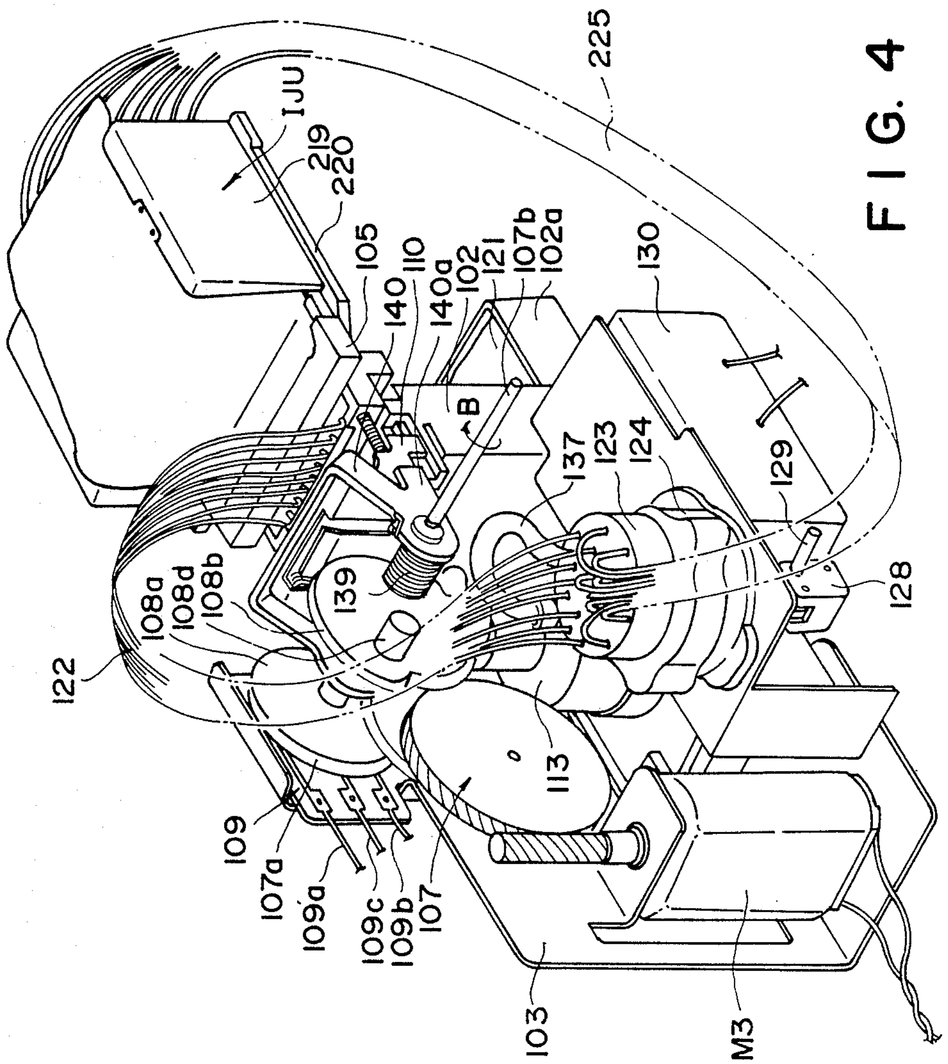
FIG. 4 is a schematic perspective view of a suction recovery system.

As will be seen from FIG. 4, the pump system PU has a supply unit for supplying the ink jet head IJU with an ink, and a recovery system unit for removing any air trapped in orifices *221a* of the nozzle 221 so as to recover the safe state of the ink jet head IJU.

The recovery system has a pump base 102, a chassis plate 103 and another chassis plate (not shown) opposing to the chassis plate 103, and the following functional parts which are mounted on or secured to the pump base and the chassis plates.

As will be described later, the supply unit has an ink jet head housing 219 which is disposed to oppose the pump base 102. The ink jet head housing 219 is provided with a multiplicity of orifices which are arranged in the direction of an arrow A in FIG. 5.

Figure 5:
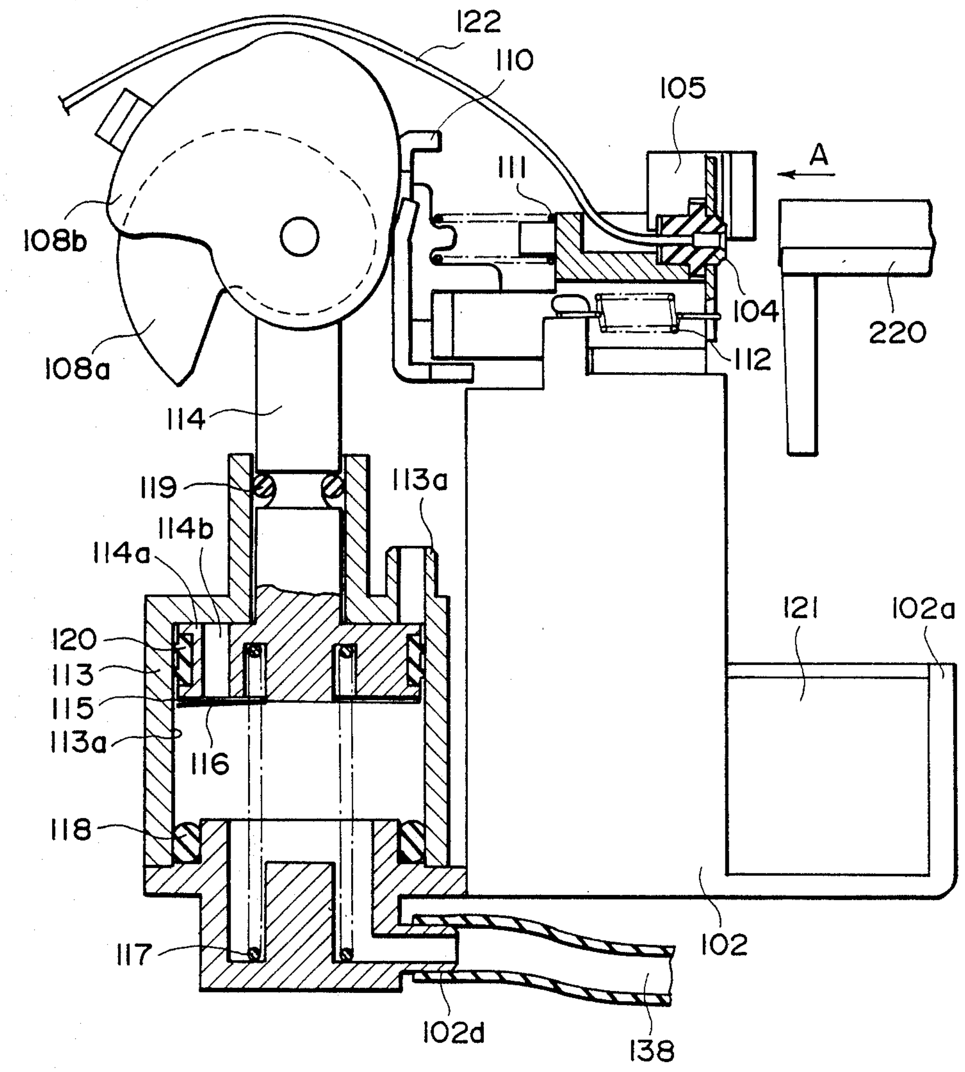
FIG. 5 is a sectional view of a vacuum generating mechanism of the suction recovery system.

As shown in FIG. 5, the pump base 102 carries a cap 104 for closing and opening the orifice *221a* of the aforementioned nozzle 221, in such a manner that the cap 104 is movable into and out of contact with the ink jet head housing 219 in the home position. The cap 104 is made of an elastic material such as a rubber, and is held by a cap holder 105 which is movable relative to the pump base 102.

The cap holder 105 is tensed in opening direction (direction of arrow A) by means of a reset spring 112. In addition, a cap lever 110 is secured to the cap holder 105 through a pressing spring 111. In order to receive ink which may drip during opening or closing of the cap 104, a laminated paper sheet 121 is laid around the pump base *102a*. A plurality of ink tubes, corresponding in number to the orifices *221a*, are press-fit in the cap 104 and all the ink tubes 122 are connected to a later-mentioned valve mechanism.

Figure 6:
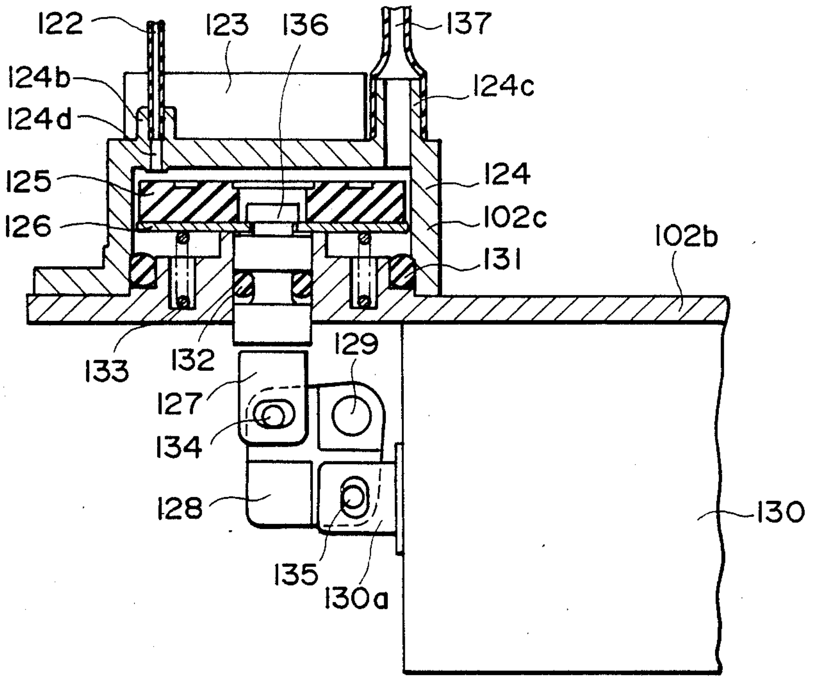
FIG. 6 is a sectional view of a valve mechanism of the suction recovery system.

FIG. 6 shows in section the valve mechanism. The valve mechanism has a valve case 124, and a pump base *102b* to which the valve case 124 is attached. The valve case 124 has apertures *124a* the number of which is twice as large as the number of the orifices *221a*. Half of the apertures receives the ink tubes 122 extending from the cap 104, while the remainder half receives discharge pipes 225 leading from the sub tank 230 in the ink jet head IJU. A tube receiver 123 made of an elastic material is press-fit in a boss 124*b* formed around each aperture 124*a*. The ink tubes 122 and the discharge tubes 225 are held by the respective tube receivers 123.

The valve case 124 receives a disk 126 serving as a piston movable up and down. The disk 126 carries a rubber plug 125 capable of contacting the apertures 124*a* so as to selectively close the latter. The disk 126 is operatively connected through a stepped boss 136 to a piston 127 which is movable up and down in a gas-tight manner within a bore in a cylindrical portion 102*c* formed on the pump base 102*b*, such that the disk 126 and the piston 127 are movable up and down as a unit. The disk 126 is upwardly urged by a spring 133 so that the rubber plug 125 is held in the position where it closes all the apertures 124*a* unless any external force is applied. An "0" ring 131 is placed between the valve case 124 and the cylindrical portion 102*c* so as to form a tight seal in the space therebetween.

To the lower end of the piston 127 mentioned before is fixed the upper end of a rotary lever 128 through a pin 134. The rotary lever 128 is rotatably supported at its intermediate portion through a shaft 129. The lower end of the rotary lever 128 is rotatably connected through a pin 135 to the projecting end of a plunger 130*a* associated with a solenoid 130. The solenoid 130, when not energized, allows the plunger to freely move but, when energized, attracts the plunger 130*a* inwardly.

The solenoid 130 is usually not energized so that the rubber plug 125 is urged by the spring 133 through the disk 126 to a position where it closes all the apertures 124*a* of the valve case 124. When the solenoid 130 is energized, the plunger 130*a* is retracted so that the rotary lever 128 is rotated about the shaft 129 so that the piston 127 is pressed down through the pin 134 against the urging force of the spring 133, whereby the rubber plug 125 opens all the apertures 124*a*.

The valve case 124 is provided with an aperture 124*c* for allowing ink to flow out therethrough. The interior of the valve case 124 is communicated with a later-mentioned vacuum generating mechanism through an ink tube 137 connected to this aperture 124*c*.

The vacuum generating mechanism will be described hereinunder. As shown in FIG. 5, the vacuum generating mechanism has a cylinder 113 attached to the pump base 102. An "0" ring 118 is interposed between the pump base 102 and the cylinder 113 so as to form a seal in the space between the pump base 102 and the cylinder 113. A piston 114 is vertically slidably received in the cylinder 113. The piston 114 is normally urged upward by a reset spring 117. When this piston 114 is pressed down against the force of the reset spring 117, a vacuum is generated in the cylinder 113.

The main part 114*a* of the piston 114 slidably received in the cylinder 113 has a bore 114*b* extending axially through the piston main part 114*a*. The underside of the piston main part 114*a* in which the bore 114*b* opens is provided with a piston valve 115 retained by a valve retainer 116 and adapted to open and close the opening of the bore. The piston valve 115 serves as a check valve which allows air to flow only from the upper side to the lower side of the piston. The ink sucked from the opening 113*a* of the cylinder 113 via the ink tube 137 is allowed to flow into the space under the piston 114 through the bore 114*b* and is discharged through a discharge port 102*d*. The thus discharged ink is collected in a waste ink reservoir (not shown) through an ink tube 138.

When the ink jet head housing 219 is closed by the cap 104, the negative pressure generated by the above-mentioned vacuum generating mechanism is transmitted to the ink jet head housing 138 through the ink tube 219, as the valve mechanism is opened so that any voids or air bubbles which may stagnate in the orifices in the ink jet head housing 219 are picked up through the ink tube 122 so as to be discharged into the waste ink reservoir.

A description will be made hereinunder as to the driving system for driving the vacuum generating mechanism. The driving mechanism has a reversible driving motor M3 the output of which is transmitted through a reduction gear train 107 to the final stage gear 107*a* of the gear train. The gear 107*a* is fixed to a rotary shaft 107*a* to which are fixed a first cam 108*a* and a second cam 108*b* for rotation together therewith.

The rotary shaft 107*a* also carries a substantially U-shaped cap lock lever 140 rotatably in such a manner as to straddle over the second cam 108*b*. The cap lock lever 140 is provided on one lateral side thereof with an engaging end 140*a* projecting radially therefrom. The engaging end 140*a* is offset from the direction of extension of the cap lock lever 140 in the direction of the second cam 108*b*, i.e., in the clockwise direction.

A coiled spring 139 wound around the rotary shaft 107*a* has one end retained by the cap lock lever 140 and the other end retained on the second cam 108*b*. Thus, the cap lock lever 140 can rotate as a unit with the retaining end 140*a* unless the latter contacts the slide guide 102*e* on the pump base 102. When the retaining end 140*a* of the cap lock lever 140 contacts the slide guide 102*e* of the pump base 102, the cap lock lever 140 locks the cap lever 110 which has moved, by the action of the second cam 108*b*, the cap 104 to a position where the latter 104 blocks the ink jet head body 222.

The outer peripheral surface of the first cam 108*a* contacts the head of the piston 114 of the vacuum generating source, so that the piston 114 is pressed down against the force of the reset spring 117 in accordance with the rotation of the first cam 108*a*. On the other hand, the outer peripheral surface of the second cam 108*b* contacts a lateral side of the cap lever 110. Therefore, the cap lever 10 is moved against the force of the pressing spring 111 in accordance with the rotation of the second cam 108*b* in such a direction that the cap 104 held by the cap holder 105 is moved to the position where it blocks the orifices 221*a* on the ink jet head housing 219.

The phase relation between the first cam 108*a* and the second cam 108*b* fixedly carried by the same shaft is as follows. In the initial position PI as shown in FIG. 5, the cam surfaces of the first and the second cams 108*a* and 108*b* which are at the smallest distances from the axis of rotation of these cams are held in contact with the head of the piston 114 and the side surface of the dust cover 110, respectively. Thus, when the cams are in the initial position PI, the vacuum generating mechanism does not produce any vacuum so that the cap 104 is held in the position where it does not block the orifices 221*a* of the ink jet head housing 219.

As the driving motor M3 operate, the first and the second cams 108*a* and 108*b* are rotated to a stand-by position which is slightly offset from the initial position PI by a predetermined amount. As the driving motor M3 further operates, the cams 108*a* and 108*b* are further rotated to a first operating position P1 shown in FIG. 9A. In this position P1, the head of the piston 114 is still held in contact with the portion of the cam surface which is at the smallest distance from the axis of rotation of this cam. Therefore, the vacuum generating mechanism is still ineffective in generating vacuum. On the other hand, the side surface of the cap lever 110 is contacted by the highest portion of the second cam 108*b*, i.e., the peripheral surface of the cam 108*b* at the greatest distance from the axis of rotation. Thus, when the cams are in the first operating position Pl, the cap 104 is held in the closing position where it closes the orifices 221*a* on the ink jet head housing 219, while the vacuum generating mechanism does not generate vacuum yet.

Figure 9A:
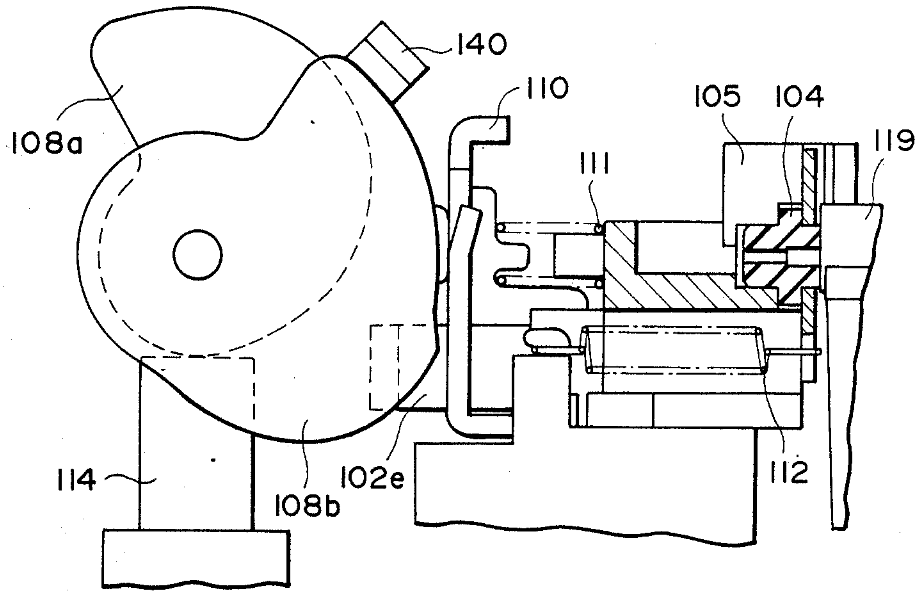
FIGS. 9A, 9B anD 9C are illustrations of operation of a first cam 108*a* second cam 108*b* as attained when a member 141 shown in FIG. 7 is in first to third positions of the pump substrate.
Figure 9B:
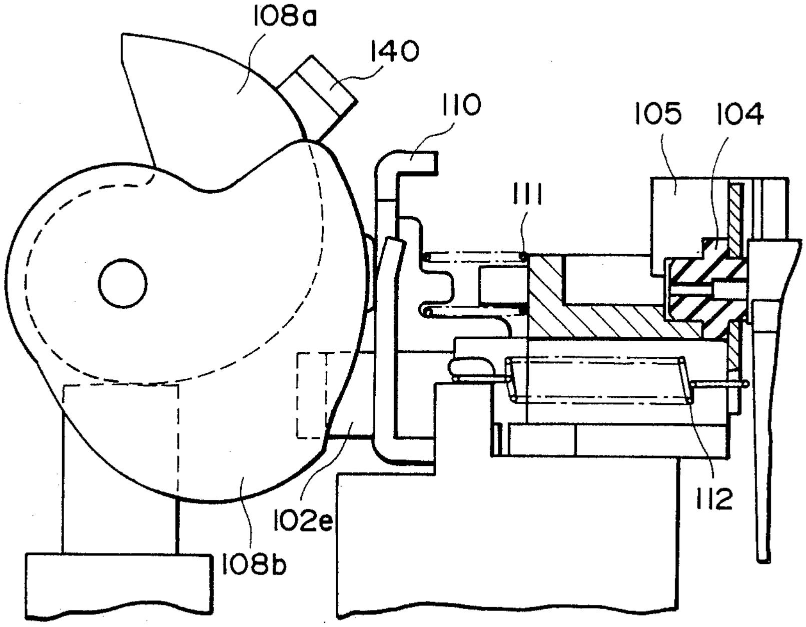

A further operation of the driving motor M3 causes the first and the second cams 108*a* and 108*b* to rotate to a second operating position P2 which is, as shown in FIG. 9B, slightly advanced in the direction of rotation from the first operating position. When the cams are in this second operating position P2, the head of the piston 114 becomes to be pressed by the cam contour. Consequently, the vacuum generating mechanism starts to generate vacuum. Meanwhile, the side surface of the cap lever 110 is still contacted by the highest portion of the second cam 108*b*. When the cams are in the second operating position, therefore, the vacuum generating mechanism starts to generate vacuum, while the cap 104 is still held in a closing position where it blocks the orifices 221*a* of the ink jet head housing 219.

Figure 9C:
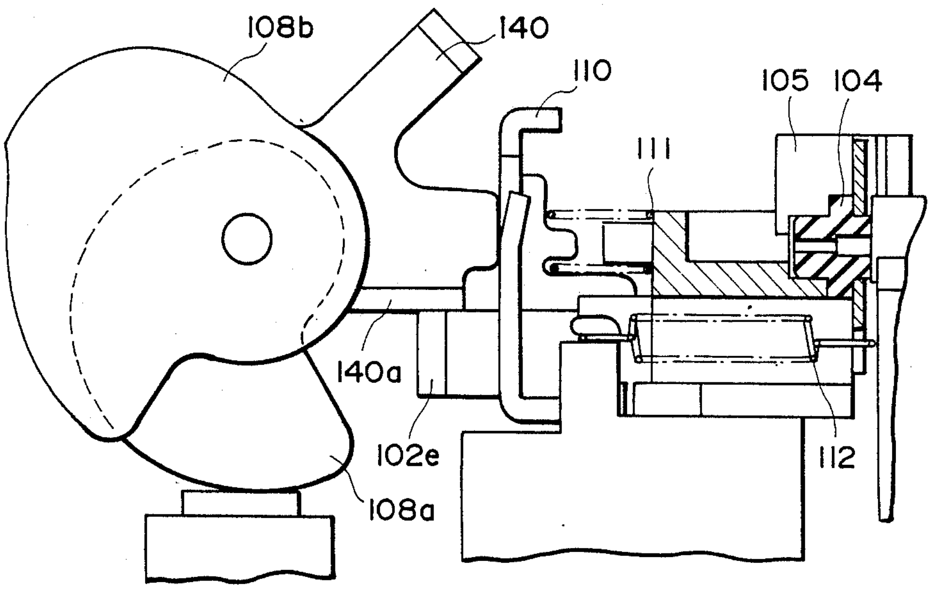

As the driving motor M3 further operates from the second operating position P2, the first and the second cams 108*a* and 108*b* are rotated through a predetermined angle to a third operating position P3 as shown in FIG. 9C. In this state, the head of the piston 114 is contacted by the highest portion of the first cam 108*a*, i.e., the peripheral surface of the cam 108*a* which is at the greatest distance from the axis of rotation of this cam. Thus, a vacuum of a sufficiently high level is generated in the vacuum generating mechanism.

Meanwhile, the side surface of the lock lever 110 is contacted by the lowest portion of the second cam 108*b*. However, during rotation of the second cam 108*b* from the second operating position P2 to the third operating position P3, the engaging end 140*a* of the cap lock lever 140 is brought into contact with the slide guide 102*e* of the pump base 102, before the lowest portion of the cam surface of the second cam 108*b* contacts the side surface of the lock lever 110, whereby the cap lock lever 140 locks the cap lever 110 which has moved, through the action of the second blocks the ink jet head housing 219.

Thus, when the first and the second cams 108*a* and 108*b* are in the third operating position P3, the cap 104 is held in the blocking position where it blocks the ink jet head housing 219, while a sufficiently high level of vacuum has been generated in the vacuum generating mechanism.

When the third operating position P3 is reached, the driving motor M3 starts to rotate in the counter direction, whereby the first and the second cams 108*a* and 108*b* commence operation in the reverse sequence to that described above, so as to be reset to the initial position P0.

Figure 7:
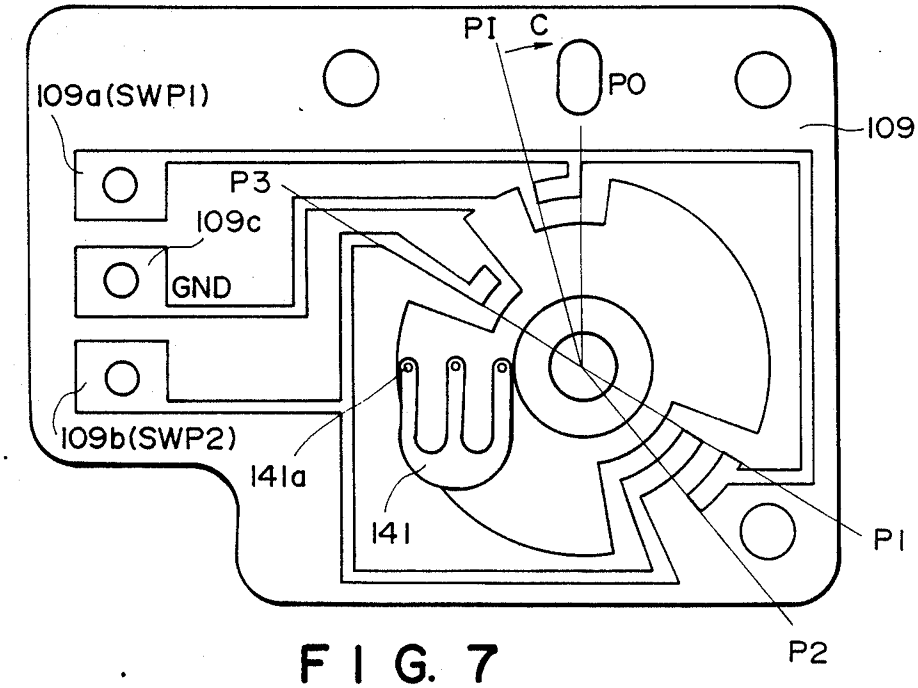
FIG. 7 is a sectional view of a pump substrate for generating a control signal which controls the operation of the suction recovery system.

In order to control the amount of operation of the driving motor M3 and, hence, the rotational positions of the first cam 108*a* and the second cam 108*b*, a contact member 141 as shown in FIG. 7 is attached to one side of the final stage gear 107*a*. The contact member 141 has three contact terminals 141*a*, 141*b* and 141*c* which are electrically connected to one another.

On the other hand, the pump substrate 109 carries a predetermined pattern PT which is adapted to be selectively contacted by the three contact terminals 141*a*, 141*b* and 141*c* in a predetermined sequence. In operation, the contact member 141 slides on the pattern PT in accordance with the rotation of the pattern PT, so that predetermined control signals are derived from the first output terminal 109*a* (SWP1) and the second output terminal 109*b* (SWP2), thereby controlling the operation of the driving motor M3 and, therefore, the rotational positions of the first cam 108*a* and the second cam 108*b*. A third output terminal 109*c* is grounded.

More specifically, during rotation of the first and the second cams 108*a* and 108*b* from the initial position P1 to the stand-by position P0, the pattern PT provides a high level signal "H" only from the first output terminal 109*a*. During rotation of the cams 108*a*, 108*b* from the stand-by position P0 to the first operating position P1, the first and the second output terminals 109*a* and 109*b* produce "L" level signals. During rotation of the cams 108*a*, 108*b* from the first operating position P1 to the second operating position P2, the first and the second output terminals 109*a* and 109*b* produce "H" level signals. During rotation of the cams 108*a*, 108*b* from the second operating position P2 to the third operating position P3, the first output terminal 109*a* produces an "L" level signal, whereas the second output terminal 109*b* produces first an "H" level signal and then an "L" level signal.

The pattern PT is so constructed that, as the first and the second cams 108*a* and 108*b* further rotate clockwise from the third operating position, the first output terminal 109*a* continues to produce an "L" level signal while the second output terminal 109*b* produces an "H" level signal.

<Ink Jet Head IJU>

The construction of the ink jet head IJU will be described with reference to FIGS. 10 and 11.

Figure 10:
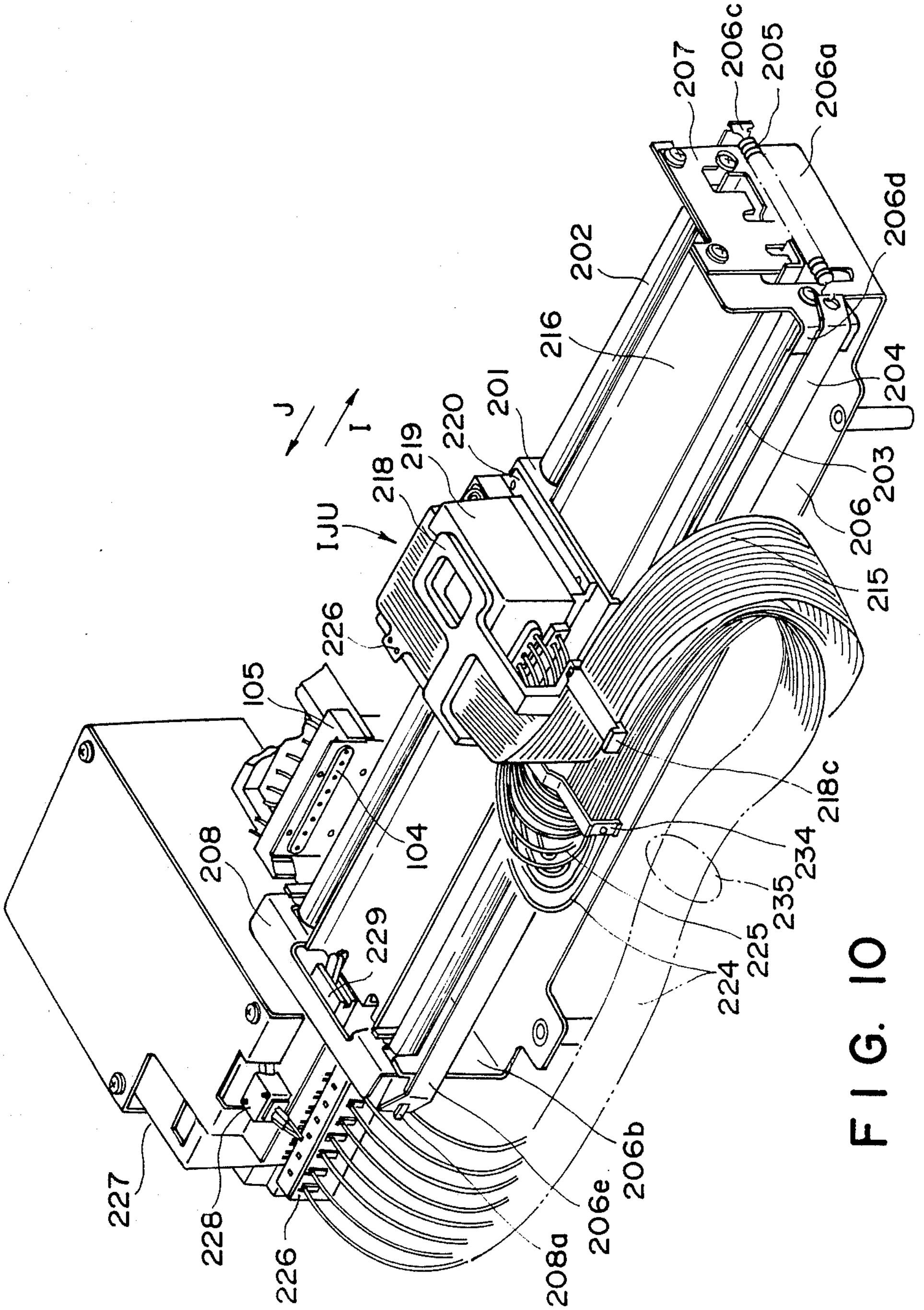
FIG. 10 is a schematic perspective view of a carriage running system.
Figure 11:
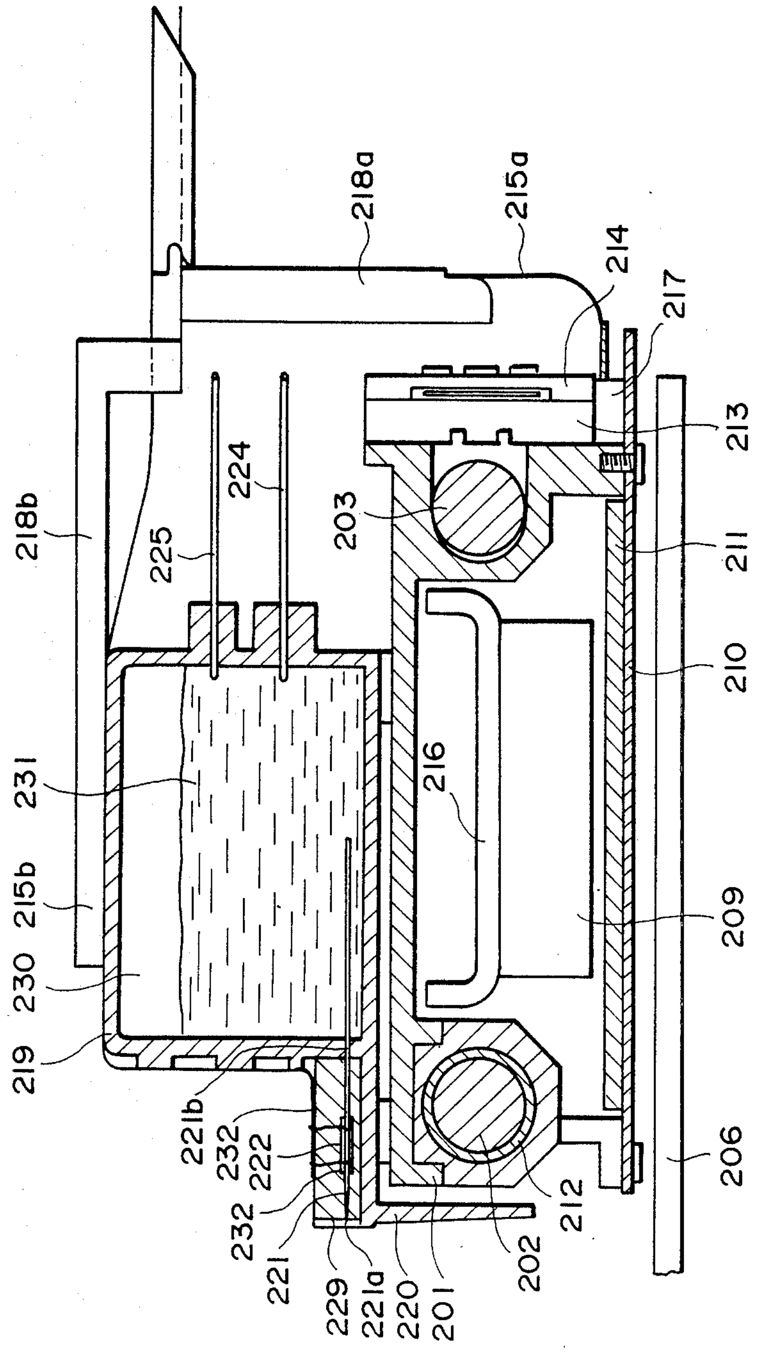
FIG. 11 is a sectional side elevational view of an ink supply system and a carriage.

FIGS. 10 and 11 are a perspective view and a sectional view, respectively, of the ink jet head IJU carried by a carriage 201 of the reciprocatory device.

As will be seen from FIG. 11, the ink jet head IJU has a downwardly opening ink jet head housing 219 and an under cover 220 which is secured in such a manner as to cover the underside of the ink jet head housing 219. The space defined by the ink jet head housing 219 and the under cover 220 constitutes a sub-tank 230. A plurality of nozzles 221 are arranged in a horizontal row on the front side of the ink jet head housing 219. The end or orifice 221*a* of each nozzle 221 is located by a front plate. In order to regulate the pitch of the nozzles 221, the nozzles are fixedly held at their mid portions 221*b* between the ink jet head housing 219 and the under cover 220.

A piezoelectric element 222 is bonded to each nozzle 221. The piezoelectric elements 222 are soldered to a flexible head portion 215 through the respective lead lines 232. The space around each piezoelectric element 222 is charged with a bonding resin. The piezoelectric elements 222 are adapted to receive ink discharge pulses through the flexible head portion 215 together with the carriage control lines.

As will be seen from FIG. 10, the flexible head portion 215 is held on the top surface of the head housing 219 by means of the flexible head retainer 218. The connecting wire portion 215*b* for transmitting the ink discharge pulses is guided by a retainer 218*b*, while the connecting wire portion 215*a* for transmitting the carriage control lines is guided by a retainer 218*a*.

A temperature sensor 226 for detecting the temperature in the head sub-tank 230 is disposed in the vicinity of the latter. The signal line carrying the signal from the temperature sensor 226 is connected through a connector (not shown) to an electric substrate (not shown) together with other lines on the flexible head portion 215.

<Supply Unit>

A description will be made hereinunder as to the supply unit for supplying the ink jet head IJU with an ink. The ink 231 is stored in a main tank (not shown) provided in the ink cartridge 10, and is adapted to be supplied therefrom to the sub-tank 230 through a needle 232 and a supply tube 224. As will be seen from FIG. 11, a discharge tube 233 is connected to a portion of the sub-tank 230 above the supply tube 224. Any ink which has overflowed the sub tank 230 is sent to the recovery system.

Thus, the level of the ink in the sub tank 230 is maintained constant by the position of the discharge pipe 233. In other words, a space of a predetermined volume is preserved in the sub tank 230 on the surface of the ink 231.

The flexible head portion 215 is secured through bolts to a flexible head retainer 218 at a pressing portion 218*c*. The supply tube 224 and the discharge tube 225 are fixed to the flexible head pressing portion 218 by means of a tube retainer 234. The flexible head portion 215, supply tube 224 and the discharge tube 225 are fixed by a tube retainer (not shown) in the vicinity of a portion marked by a circle 235 in FIG. 10 so that the movement of the flexible head portion 225, supply tube 224 and the discharge tube 225 is limited in order to avoid interference between the reciprocating carriage and these members during movement of the carriage. The ink cartridge 10 is provided with a sensor 228.

<Carriage System>

A reciprocating device for causing the ink jet head IJU reciprocatingly will be described with reference to FIGS. 10 to 12.

As illustrated, the reciprocating device has a carriage 201 carrying the ink jet head IJU. The carriage 201 is guided by a pair of guide shafts 202 and 203 so as to be movable reciprocatingly along a platen roller 222. A yoke 216 provided with a magnet 209 is extended over the entire stroke of the yoke 216 at a position below the carriage 201. The ends of the guide shafts 203, 203 are fixed by bolts to side panels 207 and 208 which are secured to the upright portions 206*a* and 206*b* of the base plate 206.

As shown in FIG. 11, a bearing made of a low-friction material is press-fit in the bearing 212 of the carriage 201 engaging with the guide shaft 202 on the front side of the carriage 201, i.e., on the side thereof facing the platen roller 22, because a specifically high sliding performance is required on this guide shaft 202. The propulsion force for propelling the carriage 201 is produced by a coil 211 which is provided on a carriage substrate 210 which is interposed between the magnet 209 and the base plate 206. The carriage substrate 210 is fixed to the underside of the carriage 201 by means of screws. Thus, a linear motor serving as a carriage motor CR for reciprocatingly propelling the ink jet head IJU is formed by the coil 211 and the magnet 209.

In order to control the movement of the carriage 201, a ribbon-shaped slit plate 204 is provided over the entire stroke of the carriage 201 so as to serve as linear encoders. The slit plate 204 is retained at their one ends by the side panel 202*a* and is pulled at its other end by the spring 205. The other end of the spring 205 is retained by the carriage baseplate 206*c*. Thus, the slit plate 204 is stretched to extend in parallel with the guide shafts 202 and 203.

The slit plate 204 is located in the longitudinal and vertical directions by grooves (not shown) formed in the carriage base plates 206*d* and 206*e*.

Figure 12:
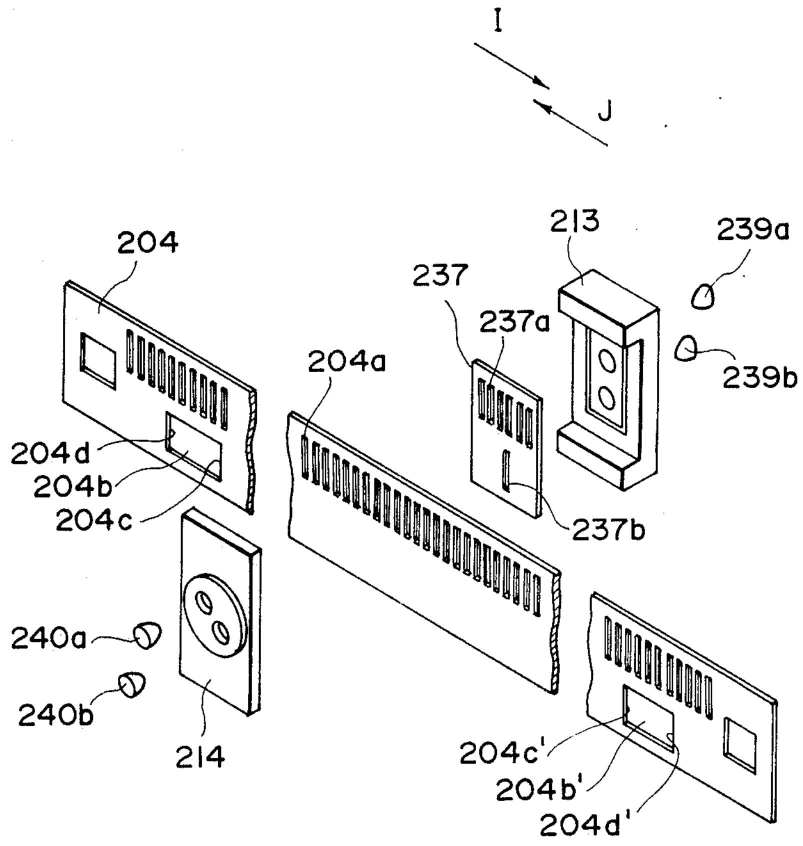
FIG. 12 is a perspective view of a ribbon in the carriage running system.

As shown in FIG. 12, the slit plate 204 is provided on the upper side thereof with constant-pitch slips 204*a* arranged at a constant pitch so as to provide ink discharging timing. The slit plate 204 also is provided on the lower side of its both ends with zone slits 204*b*, 204*b'* so as to extend in the longitudinal direction of the slit plate 204 The zone slits 204*b*, 204*b'* serve as position detecting sections for indicating the print position.

The zone slits 204*b* and 204*b'* are so sized and positioned that the distance between the outer edges 204*d* and 204*d'* correspond to the scanning width in a large-size mode, while the distance between the inner edges 204*c*, 204*c'* corresponds to the scanning width in a small-size mode.

A light-emitting portion 214 of a linear encoder is fixed to the carriage 201. The light-emitting section 214 has a pair of light-emitting elements 240*a* and 240*b* which are vertically spaced from each other. The linear encoder also has a light-receiving portion 213 arranged to oppose the light-emitting section 214 across the slit plate 204. The light-receiving section 213 has a light-receiving slit 237 and a pair of light-receiving elements 239*a*, 239*b* which are disposed to oppose the light-emitting elements 240*a*, 240*b*.

The light-receiving slit 237 is provided with constant-pitch slits 237*a* disposed at positions corresponding to the constant-pitch slits 204*a* on the upper side of the slit plate 204. A single slit 237*b* is provided at a position corresponding to each of the zone slits 204*b*, 204*b'* of the slit plate 204.

The outputs of the above-mentioned light-receiving elements 239*a*, 239*b* are delivered to the electric circuit CIR through the connector 217, and the flexible head portion 215. A home position sensor SW3 is disposed at a position corresponding to the home position of the carriage 201 for the purpose of detecting that the carriage 201 is in the home position. The home position sensor SW3 is composed of a limit switch which is adapted to be turned on when the carriage 201 is in the home position.

<Control Circuit>

Figure 13:
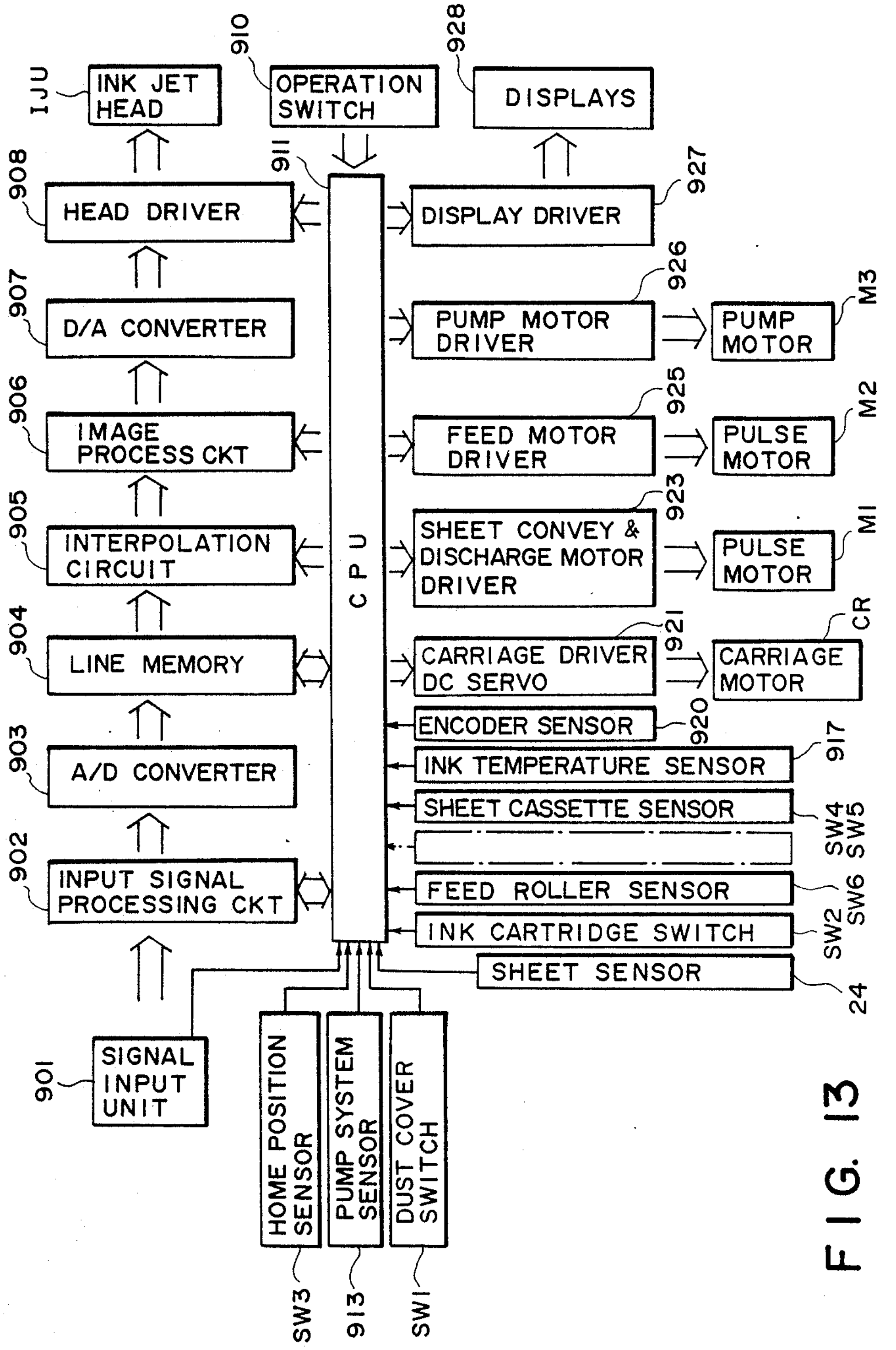
FIG. 13 is a block diagram showing the manner in which a CPU in a printer control system is connected to various parts and devices in the printer.

FIG. 13 is a block diagram of a control section in the described embodiment. Referring to this figure, the control section has a central processing unit (CPU) 911 for conducting the main control of the printer. The CPU 911 has a ROM (not shown) which stores control programs such as those shown in FIGS. 14A and 14B, and is adapted to execute these programs thereby controlling the peripheral circuits.

The CPU 911 receives, through a signal input section 901 connected thereto, various color signals such as RGB color image signals, NTSC, PAL or SECAM color television signal, and other image signals formed by, for example, by a personal computer.

To the CPU 911 are connected various circuits such as an input signal processing circuit 902 for converting color signals other than RGB into RGB signal, a line memory 904 for storing color image data corresponding to a plurality of lines, an interpolation circuit 905 for enlargement processing of a color image, an image processing circuit for conducting masking and under-color removal of color image data, and a driver circuit 908 for driving the ink jet head IJU.

An A/D converter 903 for converting an analog RGB image signal from the input signal processing circuit 902 into a digital RGB image data is connected to the above-mentioned line memory 904. A D/A converter for converting the color image data from the image processing circuit 906 into an analog image signal is connected to a head driver 908. The head driver 908 is connected to the piezoelectric type ink jet printer head IJU.

Various operation switches also are connected to the CPU 911, including the aforementioned power supply switch 6, print switch 8 and the pump switch.

Other devices and circuits connected to the CPU 911 are the pump system sensor 913, ink temperature sensor 917, encoder sensor 920, carriage motor driver circuit 921, driver circuit 923 for driving the motor Ml, driver circuit 925 for driving the motor M2, and a driver circuit 927 for the LED display group 928 which includes the aforementioned display LEDs *7a* to *7e.*

The operation will be described hereinunder.

FIGS. 14A to 14G illustrate flow charts of various control programs to be executed by the CPU 911.

<Initial Process>

Figure 14A:
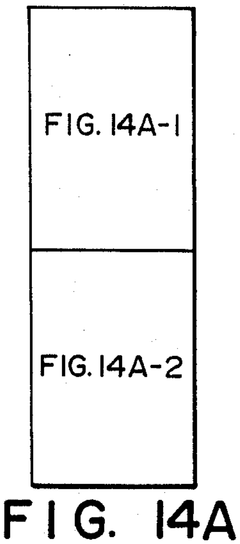
Figures 1, 14A:
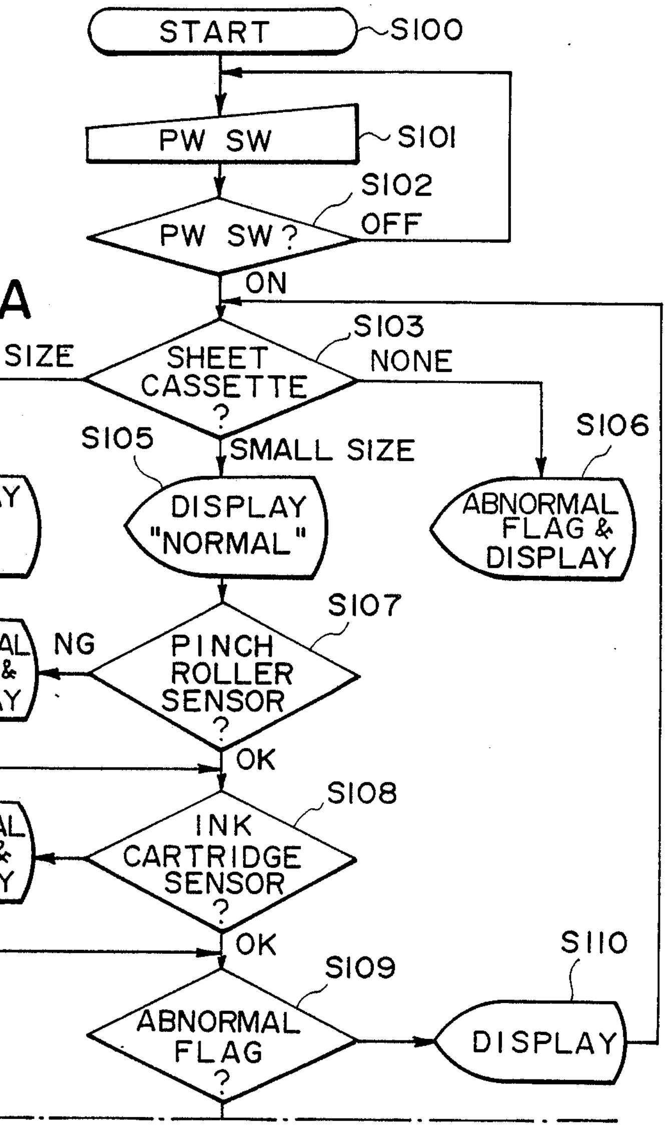
Figures 2, 14A:
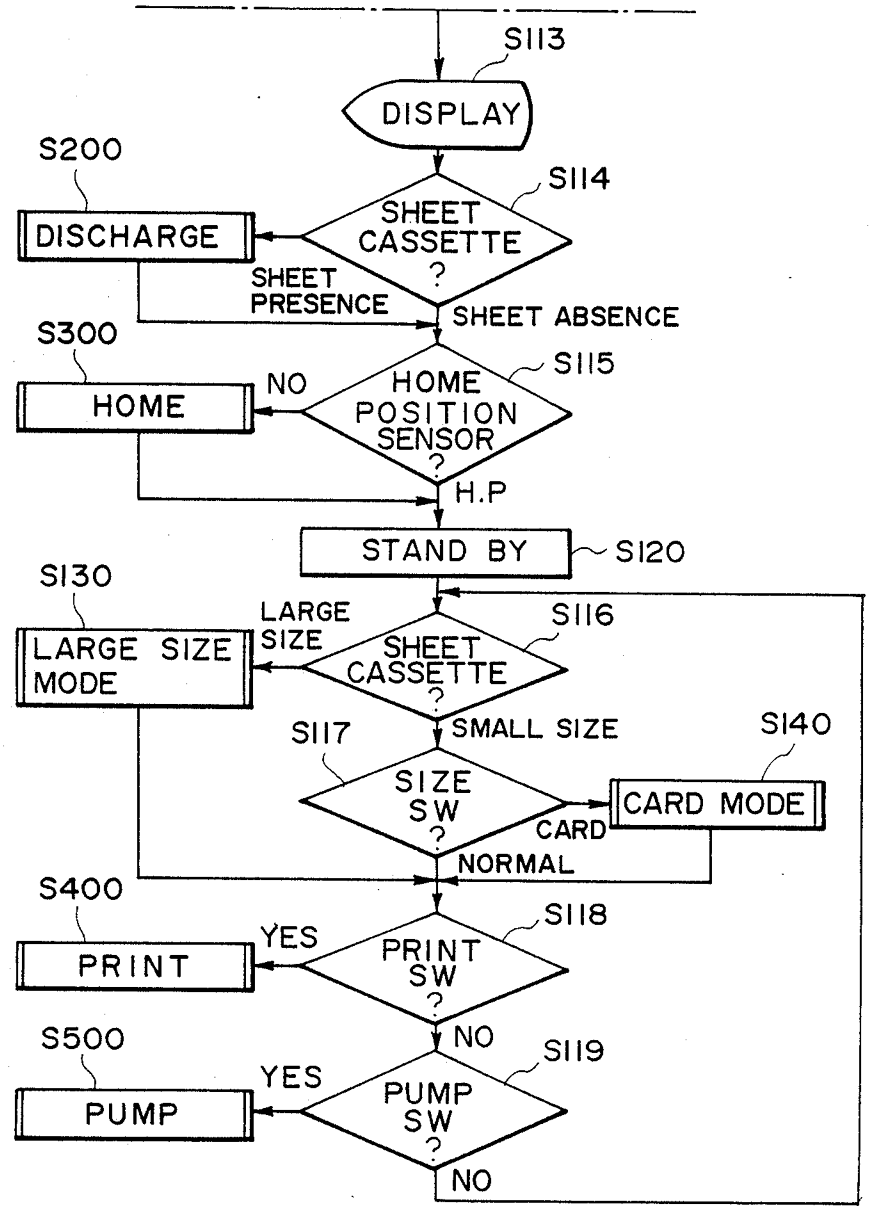

FIG. 14A is a flow chart of an initial process from the start of the power supply to the printer until the stand-by state. In Step S 101, the operator pushes the power supply switch 6. In Step S 102, the present state of the power supply switch 6 is examined and, if the switch is on, the switch is turned off. The process then proceeds to Step S 101. Conversely, if the switch 6 is off, the process proceeds to Step S 103 after turning this switch on. These steps are followed by the power supply circuit itself, independently from the CPU 911.

Subsequently, conditions necessary for commencing the printing are examined and displayed. Namely, in Step S 103, a judgment is conducted as to whether there is a cassette 2 in the printer. If there is no cassette 2, an abnormality flag is set up in Step S 106 and the LED *7a* is made to flicker. When the printer has been loaded with a cassette, if the cassette is of large size, the switch SW 5 is turned on and a display indicative of the presence of the large-size cassette is made in Step S 104. Conversely, if the cassette is of small size, the switch SW 4 is turned on, so that a display indicative of the presence of the normal size cassette is made in Step S 105. Furthermore, in Step S 107, the pinch roller sensor is examined and, if there is any abnormality, an abnormality flag is set up in Step S 11, thereby indicating the abnormality in the sheet feed system If there is no abnormality, the ink cartridge sensor SW 2 is examined in Step S 108. If there is no ink cartridge 10, an abnormality flag is set up and the LED *7b* is made to flicker to indicate abnormality in the ink system in Step S 112. If the printer has been loaded with the ink cartridge 10, the presence of any abnormality flag is checked in Step S 109. If there is any abnormality flag set high, the process returns to Step S 103. If there is no abnormality flag, the process proceeds to Step S 113 in which the normality is displayed.

In Step S 114, the paper sensor is checked and, if there is any paper sheet P in the path of convey of the sheet, a later-mentioned paper discharge process is executed in Step S 200. If there is no paper sheet P, the home position sensor SW 3 is examined in Step S 115, whereas, when the carriage 201 is not in the home position, a later-mentioned home process is executed in Step S 300.

When no abnormality is found through the described steps, the process proceeds to Step S 120 so that the printer is set in the stand-by state In this stand-by state, the printer is ready for receiving instructions such as a cassette changing instruction, a print instruction and a pumping instruction. More specifically, when the presence of the large-size cassette is detected in Step S 116, the operation mode is changed to the large-size mode in Step S 130. On the other hand, when the cassette detected in Step S 116 is the small-size cassette, the process proceeds to Step S 117 in which the state of the size switch is checked. If the output from the size switch shows that the cassette is of post-card size, the operation mode is changed to post-card mode in Step S 140. If not, the operation mode is changed to the normal mode. When on-state of the print switch 8 is detected in Step S 118, the process proceeds to Step S 400 in which a later-mentioned print process is commenced. When on-state of the pump switch is detected in Step S 119, the process proceeds to Step S 500 to commence a later-mentioned pumping process.

<Carriage Operation>

FIG. 10 illustrates the appearance of the carriage mechanism. FIG. 12 is an encoder of a carriage 201.

When the printing is not to be conducted, the carriage 201 is stationed in the home position, but is started to move in the direction of an arrow I in response to input of a print signal. As a result, the light emitted from the light-emitting element 240*a* is interrupted by the timing slit 204*a* so that the light-receiving element 239*a* produces an on/off signal.

The CPU 911 controls the current supplied to the coil 211 on the carriage substrate 216 in response to the on-off signal from the light-receiving element 239*a,* thereby causing the carriage 201 to scan at a constant speed. The on-state or off-state of the on/off signal mentioned above corresponds to one dot of pixel so that it is used as a timing control signal for jetting a piece of ink droplet.

On the other hand, the light emitted from the light-emitting element 240*b* fixed to the carriage 201 is interrupted by the zone slit 204*b,* 204*b'* and the light-receiving slit 237*b,* so that the output of the light-receiving element 239*b* is turned on and off by the edges 204*c,* 204*c'*, 204*d* and 204*d'* of the zone slits 204*b* and 204*b'*. As a result, the carriage 201 moves in the direction of the arrow I after commencing the printing operation.

When the mode of the printing operation is the large-size mode, the edges 204*d* of the zone slits 204*b,* 204*b'* are detected, whereas, when the operation mode is the small-size mode, the edges 240*c* are detected. Thereafter, head driving pulses corresponding to the image data are supplied to a piezoelectric element 222 on a nozzle 221 through the flexible circuit 215, at a timing determined by the on/off signals from the light-receiving element 239*a* and over with a predetermined point number and in accordance with the print size, whereby an ink droplet is discharged to form a dot on the paper sheet.

After the detection of the edge **204*d*', the carriage 201 is inverted and starts to run in the direction indicated by an arrow J. The printing is commenced after detection of the edge 204*d*' when the cassette 2 is the large-size cassette and after detection of the edge 204*c*' when the cassette 2** is the small-size cassette.

After printing a predetermined number of dots, the edge **204*d* is detected so that the carriage is reversed. This reciprocal operation is repeated by a number which is required to complete the formation of the required print image. Thereafter, the carriage 201 is returned to the home position and is stopped as the home position sensor SW 3** is turned on.

<Operation of Recovery System>

The operation of the recovery system is necessary when any defect such as blanking is found in the print image as a result of, for example, clogging the orifice **221*a* or orifices of the nozzle 221. FIG. 5 is a sectional view of the mechanical portion of the recovery system, FIG. 7 is a front elevational view of a pump substrate for generating the control signal for controlling the recovery system, and FIG. 8** shows timing charts of the control signals $SWP_1$ and $SWP_2$ in the recovery system.

Figure 8:
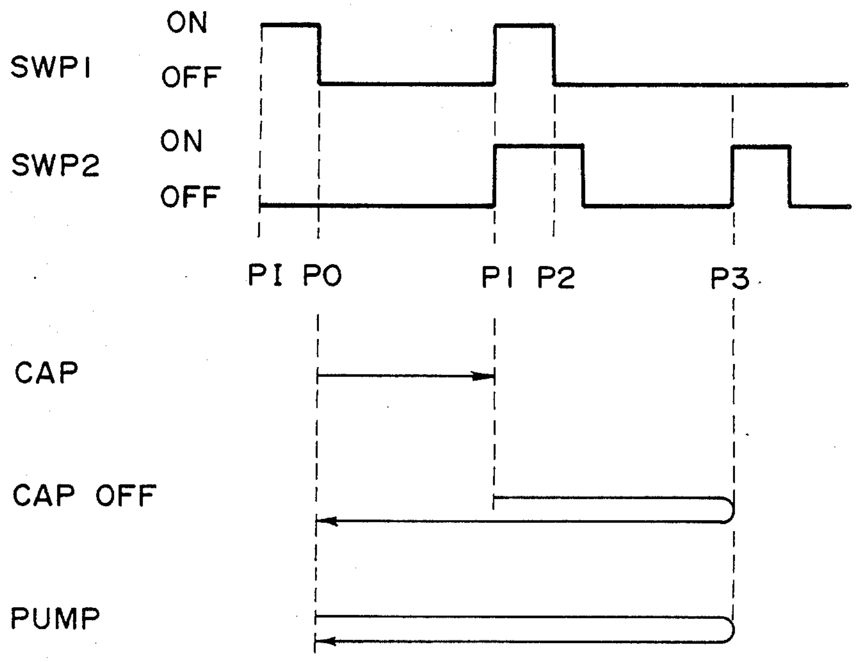
FIG. 8 is a timing chart of a pair of control signals $SWP_1$ and $SWP_2$ in the recovery system.

The control signals $SWP_1$ and $SWP_2$ shown in FIG. 8 are obtained when the contact member 141 shown in FIG. 7 is rotated in the direction of an arrow C from the initial position P0 towards the third operating position P3 on the pump substrate 109. FIG. 9A shows the operations of the cams **108*a* and 108*b* when the contact member 141 is at the first operating position Pl, FIG. 9B shows the operations of the cams 108*a* and 108*b* when the contact member 141 is at the second operating position P2, and FIG. 9C shows the operations of the cams 108*a* and 108*b* when the contact member 141 is at the third operating position P3**.

(Recovery Process)

Figure 14B:
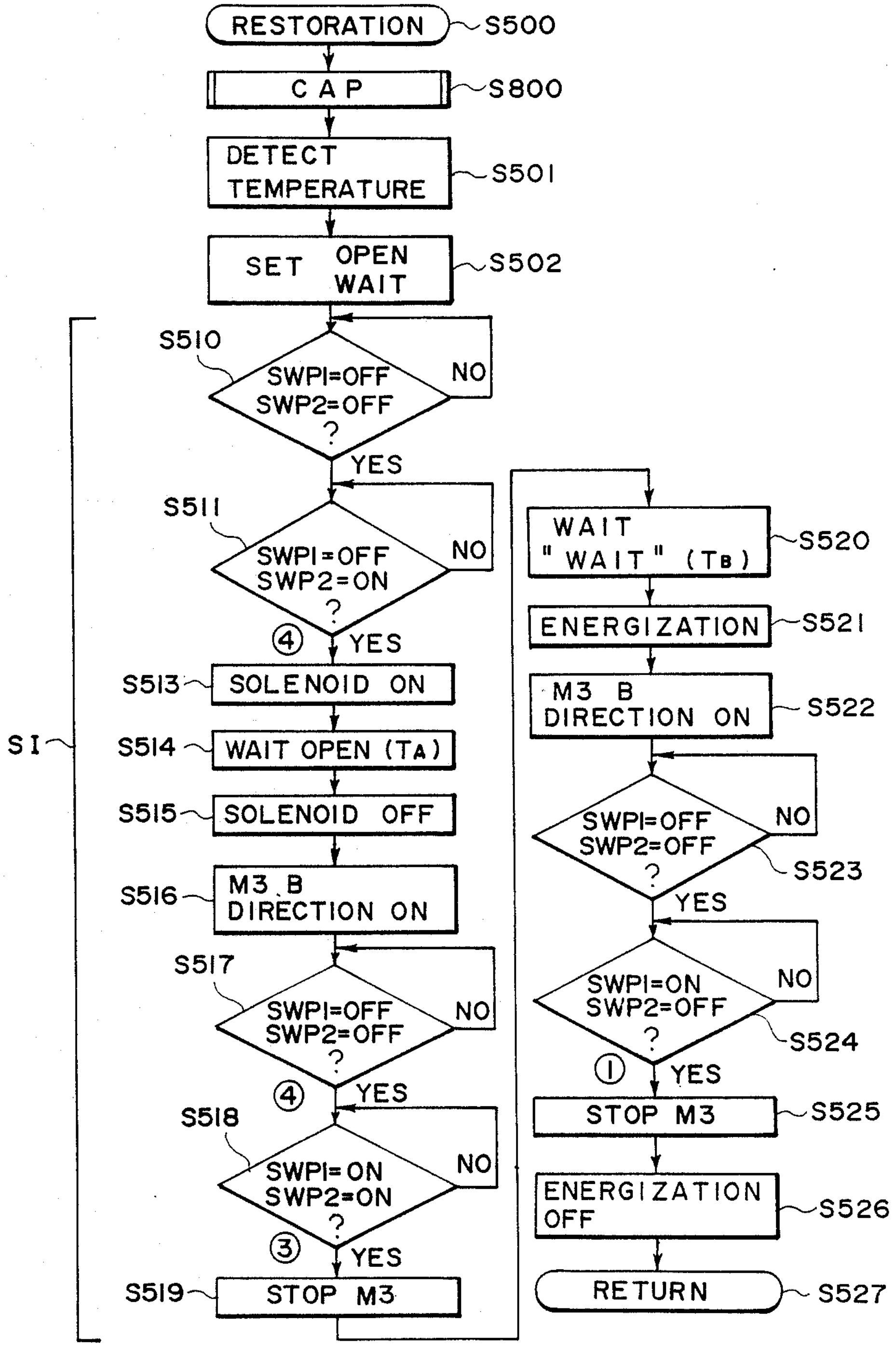

FIG. 14B is a flow chart of a recovery process for recovering the safe operation from an abnormal state such as clogging in a nozzle 221. The instruction for commencing the recovery process S 500 is given by the operator who presses the pump button when the p inter is in the stand-by state as shown in FIG. 14A. The recovery process includes a capping process for capping the nozzles 221 with the cap 104, pumping process for inducing a predetermined amount of ink from the nozzles 221, and an uncapping process for removing the cap 104 from the nozzle 221.

(Capping Step)

Figure 14C:
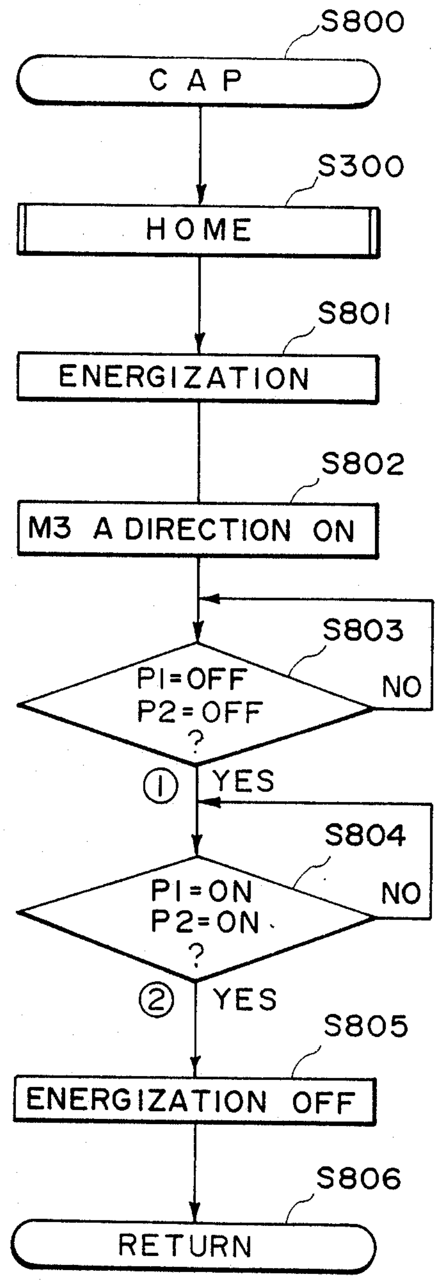
FIG. 14C is a flow chart of a capping process.

FIG. 14C is a flow chart of the capping process. In Step S 300, a later-mentioned home process S 300 is executed so as to return the carriage 201 to the home position. In Step S 801, the carriage motor CR is reenergized at the home position. Since the carriage motor CR is a linear motor, the fixing of the carriage 201 relies only upon the frictional force in the bearings when the coil of the linear motor is de-energized. The carriage 201 therefore will be moved from the home position by, for example, a tension in the tubes. To avoid this, the carriage motor CR is reenergized so as to keep the carriage 201 in contact with a damper, until the capping process is completed.

In Step S 802, the motor M3 is operated forwardly so that the cams are rotated from the initial position P0 to reach the stand-by position Pl in Step S 803. In this state, both the control signals $SWP_1$ and $SWP_2$ are turned off. As the motor M3 further operates forwardly, the first operating position P1 is reached in Step S 804 so that the conditions of $SWP_1$=ON and $SWP_2$=ON are met. When these conditions are met, the motor M3 is stopped in Step S 805.

Meanwhile, the cams **108*a* and 108*b* rotate to the position shown in FIG. 12 to the position shown in FIG. 16A, so that the second cam surface 109*b* pushes the cap lever 110 towards the ink jet head IJU along a guide presented by the pump base 102*e***.

The cap lever 110 further pushes the cap holder 105 progressively towards the ink jet head IJU through the action of the spring 111 against the urging force produced by the reset spring 112, whereby the cap 104 abuts the front plate on the ink jet head IJU. The cap lever 110 is further pressed so that the spring 11 is charged to produce an urging force which charges the cap 2104 which is made of an elastic material such as a rubber, whereby the orifices are closed. Meanwhile, the engaging end **140*a* of the cap lock lever 140 rotates in the same manner as the second cam 108*d* while abutting the stopper portion 108*d* of the cam 108, because the cap lock lever 140 is urged by the coiled spring 139 in the direction of the arrow 139. In consequence, the engaging end 140*a* abuts the slide guide portion 102*e* of the pump base 102, thus locking the cap lever 110 as shown in FIG. 9C. In on sequence, the capping operation is completed so that the ink jet head IJU is fixed. In Step S 805, the excitation of the carriage 201** is de-energized.

(Pumping Step)

The pumping process is conducted through Steps S 501 to S 520 in FIG. 14B.

In Step S 501, the temperature of the portion near the ink jet head body 219 is detected by a temperature sensor 226. In Step S 502, waiting times $T_A$ and $T_B$ are determined in accordance with the detected temperature. It is to be noted that the ink which is a liquid medium changes its viscosity according to the temperature. Therefore, if the ink sucking time for recovering the ordinary state of the nozzle 221 is fixed, an excessively large quantity of the ink will be sucked when the ink temperature is high because in such a state the ink exhibits a low level of viscosity. Conversely, the amount of ink sucked will be too small when the ink temperature is low because in such a case the viscosity of the ink is high.

According to the invention, optimum waiting times $T_A$ and $T_B$ are set upon consultation with a table in relation to the detected temperature of the ink in the sub-tank 230, in order to ensure that the ink is sucked in an amount which is necessary and enough for the recovery of the ordinary state of the ink nozzle. The table contains data of the waiting time $T_A$ in relation to the ink temperature such that, the higher the ink temperature, the shorter the waiting time $T_A$. In consequence, a substantially constant amount of ink, which is necessary and enough for the recovery of the nozzle 221, is sucked regardless of the temperature. As to the waiting time $T_B$, the table content is set such that the lower the ink temperature, the longer the waiting time $T_B$, thereby optimizing the waiting time so as to avoid any clogging which may occur again.

In Step S 510, the motor M3 is operated forward until the condition of $SWP_1$=OFF and $SWP_2$=OFF are met. In Step S 511, the motor M3 is further operated until conditions representing the arrival at the third operating position, i.e., $SWP_1$=OFF and $SWP_2$=ON, are met. When these conditions are met, the motor M3 is stopped in Step S 512. Meanwhile, the first cam 108*a* and the second cam 108*b* rotate from the state shown in FIG. 9B to the state shown in FIG. 9C. During the rotation, the cam surface of the first cam 108*a* presses the piston 114 of the vacuum generating mechanism downward against the force of the spring 117.

In this state, since the valve of the valve mechanism connected to the upstream side of the cylinder 113 has been closed, the ink cannot flow into the space on the upper side of the piston 114. Thus, a certain level of vacuum is maintained in this space. Meanwhile, the ink which has been sucked in the previous pumping operation and accumulated in the space on the lower side of the piston 114*a* is discharged into the waste ink reservoir from the discharge port 102*d* and through the discharge tube 138.

In Step S 513, the solenoid 130 of the valve mechanism is energized and, in Step S 514, the operation is suspended throughout the waiting time $T_A$, followed by de-energization of the solenoid 130 in Step S 515. FIG. 6 shows the state of the system in which the solenoid 130 has been energized. As the solenoid 130 is energized, the plunger 130*a* is magnetically attracted so that the rotational lever 128 is rotated about the shaft 129 through the pin 135, whereby the piston 127 is moved downward through the pin 134. In consequence, the rubber plug 125 which has blocked the ink inlet port 124*a* is pulled downward, thereby opening the ink inlet port 124*a*.

As a result, the vacuum which has been generated in the vacuum generating mechanism and transmitted to the inside of the valve case through the tube 137 is transmitted to the nozzle 221 through the ink tube 122. Consequently, the ink in the nozzles 221 is sucked together with any bubbles of air stagnant in these nozzles, whereby the nozzles 221 are recovered. In this embodiment, since the solenoid 130 is used as the actuator for the valve mechanism, the valve is safely closed when the power supply is accidentally stopped due to, for example, a power failure during the recovering operation, whereby the mixing of colors in the nozzles can be avoided. In Step S 516, the pulse motor M3 is reversed and the motor M3 is stopped in Step S 519, through Step S 517 in which the states of $SWP_1$=OFF and $SWP_2$=OFF representing the stand-by position PO are obtained and through Step S 518 in which conditions of $SWP_1$=ON and $SWP_2$=ON representing the initial position PI are obtained. Meanwhile, the first cam 108*a* and the second cam 108*b* are rotated from the state shown in FIG. 9C to the state shown in FIG. 9B, whereby the piston 114 is progressively raised by the force of the spring 117 while contacting the cam surface of the first cam 108*a*, until it is stopped by the head of the cylinder 113. In the state shown in FIG. 9B, the cam surface of the first cam 108*a* is out of contact with the piston 114, and is freed from the piston 114. During upward stroking of the piston 114, the ink sucked through the operation of the valve mechanism is allowed to flow into the space under the main part 114*a* of the piston 114 through the bore 114*b* formed in the piston 114.

Thereafter, the operation is suspended in Step S 520 until the waiting time $T_B$ elapses. This waiting time is intended for eliminating such trouble that the nozzle being unable to discharge ink due to suction of air which may occur when the ca 104 is removed before the breakage of the vacuum in the sub-tank 230 which has been established as a result of suction of ink through the nozzles 221 and discharge tubes 122 during the recovery operation. Thus, the operation is suspended for the waiting time $T_B$ to wait for the recovery of normal pressure in the sub-tank 230 caused by the supply of the ink from the main tank of the ink cartridge into the sub-tank 230.

(Uncapping Operation)

Steps S 521 onwards in FIG. 14B constitute a flow chart of uncapping operation. In Step S 521, the carriage motor CR is energized while the carriage 201 is in the home position so as to fix the carriage 201.

In Step S 522, the pulse motor M3 is reversed so that the conditions of $SWP_1$=OFF and $SWP_2$=OFF, representing the resetting from the first operating position P1 to the stand-by position P0 are met in Step S 523 and the conditions of $SWP_1$=ON and $SWP_2$=OFF representing the resetting to the initial position PI are met in Step S 524. When these conditions are met, the pulse motor M3 is stopped in Step S 525. Meanwhile, the first cam 108a and the second cam 108*b* are moved from the state shown in FIG. 9B to the state shown in FIG. 5, so that the stopper portion 108*d* of the second cam 108*b* pushes the second cam 108*b* thereby allowing the cap lock lever 140 to unlock the cap lever 110, whereby the cap lever 110 is progressively moved downward along the cam surface of the second cam 108*b*. On the other hand, the cap holder 105 also is progressively urged rearward by the reset spring 112, so that the cap 104 opens the orifices 221*a* of the nozzles 221, whereby the recovering operation is completed. Finally, the carriage motor CR is de-energized in Step S 526.

(Home Process)

Figure 14D:
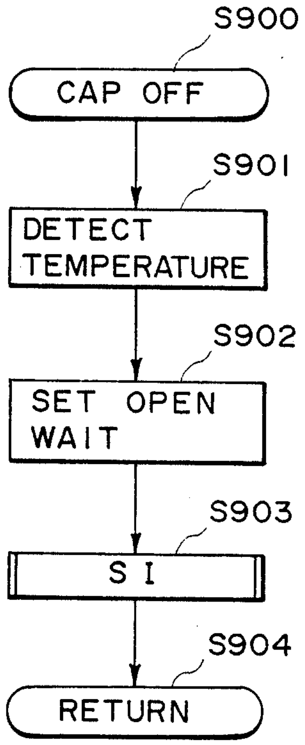
FIG. 14D is a flow chart of an uncapping process.
Figure 14F:
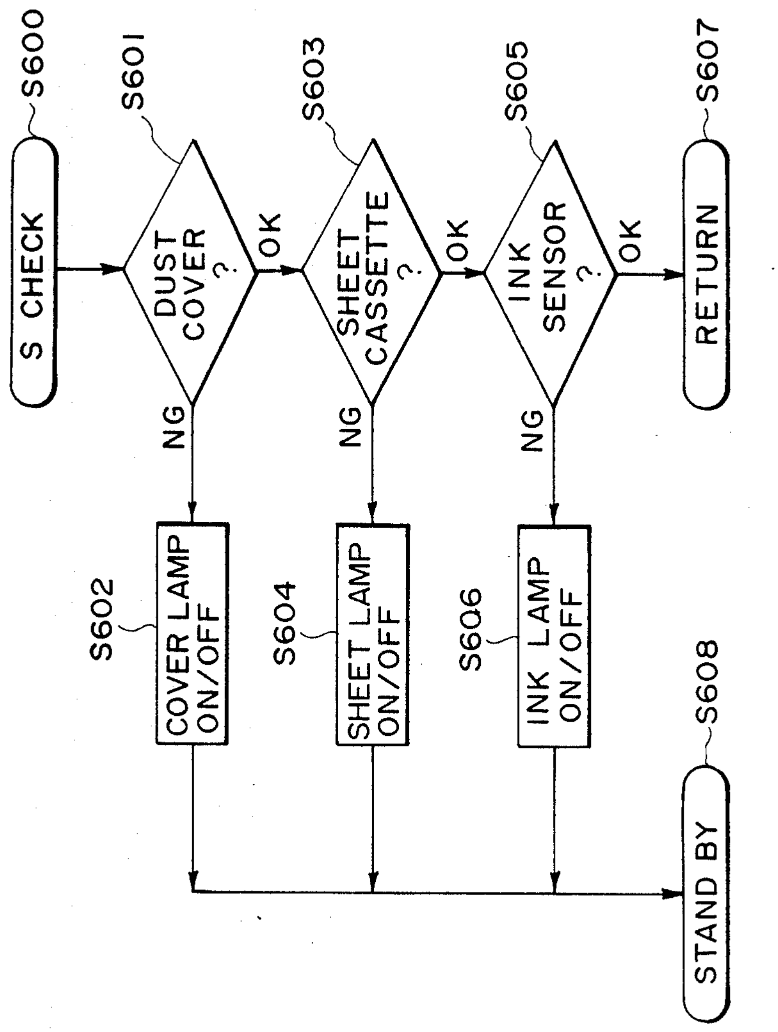
FIG. 14F is a flow chart of a status check process.
Figure 14G:
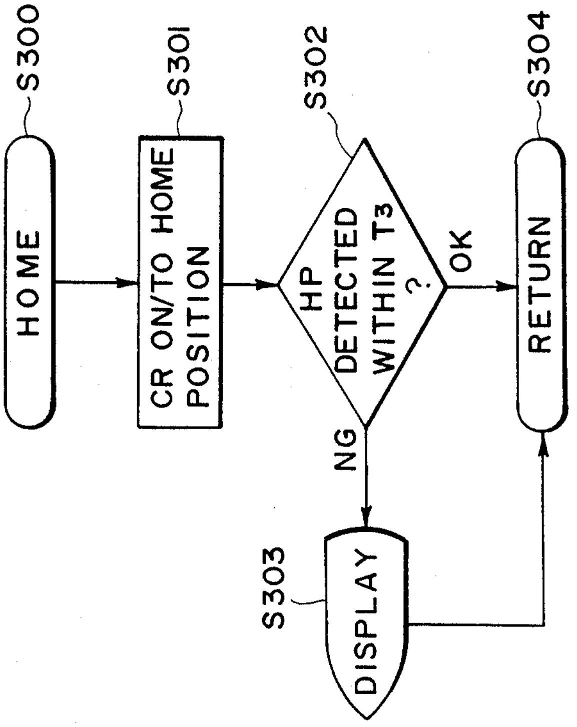
FIG. 14G is a flow chart of a home process.

FIG. 14G is a flow chart showing the home process. The home position is the position of the head 219 where it faces the cap 104 of the recovery system in FIG. 10. In Step S 301, the carriage motor CR is energized so that the carriage 201 is driven towards the home position. In Step S 302, a check is conducted as to whether the home position sensor SW 3 has been turned on within a predetermined time $T_3$. An answer no to this question suggests that there is a trouble in the movement of the carriage 201, so that a display is made in Step S 303 to indicate the occurrence of the trouble. If the answer is YES, the carriage motor CR is deenergized.

<Cap-Off Process>

FIG. 14D is a flow chart illustrating the cap-off process.

The cap is usually held in the capping position before the power supply switch 6 is turned on, and the cap-off process is automatically commenced as the power supply switch is turned on. When the power supply switch 6 is turned off after completion of operation of the printer, the capping operation is conducted to bring the cap 104 into contact with the front plate and is elastically charged. The elastic charging of the cap 104 causes a small quantity of air to be forced into the ends of the nozzles 221. The cap-off operation, therefore, requires suction of air from the nozzles in advance thereof. In Step S 901, the ink temperature is detected as in the case of the pumping process described before, and waiting times $T_A'$ and $T_B'$ are determined in Step S 902 on the basis of the detected temperature. Unlike the pumping operation, the waiting times $T_A'$ and $T_B'$ are intended only for sucking air stagnant in the vicinity of the nozzle so that these waiting times are considerably shorter than those adopted in the pumping operation.

The routine SI conducted in Step S 903 is the same as the process of Steps S 510 onwards shown in FIG. 14B. Thus, the first and the second cams 108*a* and 108*b* start to rotate from the position shown in FIG. 16A to the state shown in FIG. 9C while pressing down the piston 114. In this state, the valve is opened for the waiting time $T_A'$ so as to allow the air bubbles in the ends of the nozzles to be sucked. Subsequently, the pulse motor M3 is reversed to bring the first cam 108*a* and the second cam 108*b* to the positions shown in FIG. 9B and the cams are held in this position for the waiting time $T_B'$. The pulse motor M3 is driven again so that the first and the second cams 108*a* and 108*b* are rotated to the position shown in FIG. 5B, whereby the cap-off operation is completed.

<Power Off Process>

Figure 14E:
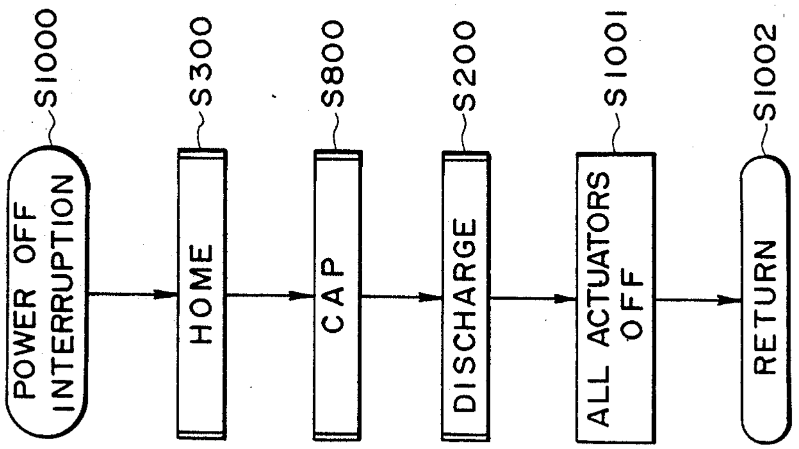
FIG. 14E is a flow chart of an interrupting operation conducted when the power supply is turned off.

FIG. 14E is a flow chart illustrating the power off process. Usually, the head 219 is stationed at the home position after completion of the required printing operation or after the power supply switch 6 has been turned off. Therefore, all the actuators are turned off in Step S 1001, after execution of the home process in Step S 300, the capping process in Step S 800, and the paper discharging process for discharging any sheet remaining on the path of convey in Step S 200.

As will be understood from the foregoing description, according to the invention, it is possible to regulate the amount of ink sucked during the recovery operation regardless of the ink temperature, by varying the sucking time in accordance with the change in the ink temperature. The apparatus of the invention therefore ensures a highly economical use of ink, by reducing the amount of ink which is unnecessarily sucked during the recovery operation.

What is claimed is:

1. An ink jet recording apparatus comprising:

recording means having a discharge port for discharging ink an accordance with input information;

temperature detecting means for detecting temperature in the portion of the apparatus near said recording means;

capping means for closing and opening said discharge port;

vacuum generating means, communicating with said capping means, for generating vacuum of a level high enough to induce the ink from said discharge port;

a valve mechanism for connecting and disconnecting communication of said capping means with said vacuum generating means; and driving means for driving said valve mechanism for a period of time determined in accordance with the result of detection by said temperature detecting means to connect said capping means with said vacuum generating means for a first period of time and in a second mode to connect said capping means with said vacuum generating means for a second period of time when power is first supplied to the apparatus, the first period of time being longer than the second period of time.

2. An ink jet recording apparatus according to claim 1, wherein said driving means is adapted to drive said valve mechanism such that the amount of ink sucked from said discharge port tends to be increased when the temperature detected by said temperature detecting means is low and that the amount of ink sucked from said discharge port tends to be decreased when the temperature detected by said temperature detecting means is high.

3. An ink jet recording apparatus according to claim 1, wherein said driving means is operated in the first mode by manually placing a switch in an on position.

4. An ink jet recording apparatus comprising:

recording means having a discharge port for discharging ink in accordance with input information;

capping means for closing and opening said discharge port;

vacuum generating means capable of communicating with said capping means and generating a vacuum for sucking ink through said discharge port;

cap drive means for moving said capping means so as to open and close said discharge port; and a valve mechanism for connecting and disconnecting communication of said capping means with said vacuum generating means, wherein said valve mechanism is operable in a first mode to connect said capping means with said vacuum generating means for a first period of time and in a second mode to connect said capping means with said vacuum generating means for a second period of time when power is first supplied to the apparatus, the first period of time being longer than the second period of time, and said valve mechanism transmits the vacuum generated by said vacuum generating means to said capping means prior to the movement of said capping means.

5. An ink jet recording apparatus according to claim 4, wherein said valve mechanism operates to suck a predetermined amount of ink from said capping means when power is first supplied to the apparatus.

6. An ink jet recording apparatus according to claim 4, wherein said valve mechanism is operated in the first mode by manually placing a switch in an on position.

7. An ink jet printer comprising:

an ink jet recording head for discharging ink in accordance with input information;

a cap for closing and opening an orifice of the ink jet recording head;

a suction pump communicating with said cap for generating a predetermined vacuum for drawing the ink through said orifice;

a valve for controlling transmission of the vacuum generated by said suction pump to said cap;

a temperature sensor for detecting temperature in the portion of the printer near said ink jet recording head; and a controller for driving said valve for a period of time determined in accordance with the result of detection by said temperature sensor, wherein said controller, when power is first supplied to the printer, transmits the vacuum generated by said suction pump to said cap prior to the opening of said orifice.

8. An ink jet printer according to claim 7, wherein said printer is operable in at least a first mode to connect said cap with said suction pump for a first period of time and a second mode to connect said cap to said suction pump for a second period of time when power is first supplied to the printer, the first period of time being longer than the second period of time.

9. An ink jet printer according to claim 7, further comprising an ink tank for containing ink to be supplied to said ink jet recording head, and wherein after a sufficient period of time is allowed to expire to remove negative pressure in said ink tank, said cap opens said orifice.

10. An ink jet printer according to claim 7, wherein said controller drives and valve such that the amount of ink drawn from said orifice tends to be increased when the temperature detected by said temperature sensor is low, and the amount of ink drawn from said orifice tends to be decreased when the temperature detected by said temperature sensor is high.

11. An ink jet printer according to claim 7, wherein said valve draws a predetermined amount of ink from said orifice by the transmission of the vacuum to said cap when the power is first supplied to the printer .

12. An ink jet recording apparatus comprising:

recording means having a discharge port for discharging ink in accordance with input information;

a cap for closing and opening said discharge port;

a suction pump communicating with said cap and generating a predetermined vacuum for drawing the ink through said discharge port;

a valve for controlling transmission of the vacuum generated by said suction pump to said cap;

a temperature sensor capable of sensing temperature in the portion of the apparatus near said recording means; and a controller for driving said valve for a period of time determined in accordance with the result of detection by said temperature sensor to connect communication of said cap with said suction pump, wherein said controller is operable in a first mode to connect said cap with said suction pump for a first period of time and in a second mode to connect said cap with said suction pump for a second period of time when power is first supplied to the apparatus, the first period of time being longer than the second period of time.

* * * * *

UNITED STATES PATENT AND TRADEMARK OFFICE
CERTIFICATE OF CORRECTION

PATENT NO. :4,926,196 Page 1 of 4

DATED :May 15, 1990

INVENTOR(S) :YOSHIYUKI MIZOGUCHI, ET AL.

It is certified that error appears in the above-identified patent and that said Letters Patent is hereby corrected as shown below:

COLUMN 1

Line 66, "ture printer;" should read --ture of the printer;--.

COLUMN 2

Line 11, "first cam 108a second cam 108b" should read --first cam 108a and a second cam 108b--.
Line 25, "unit" should read --until--.
Line 26, "FIGS. 14A-1 and 14A-2 are" should read --FIG. 14B is--.

COLUMN 3

Line 7, "button 5." should read --slide 5.--.
Line 62, "presence of absence" should read --the presence or absence--.

COLUMN 6

Line 6, "ink jet head housing 138" should read --ink jet head housing 219--.
Line 7, "219," should read --238,--.
Line 18, "shaft 107a" should read --shaft 107b--.
Line 20, "107a" should read --107b--.
Line 29, "107a" should read --107b--.
Line 46, "10" should read --110--.

UNITED STATES PATENT AND TRADEMARK OFFICE

CERTIFICATE OF CORRECTION

PATENT NO. : 4,926,196
DATED : May 15, 1990
INVENTOR(S) : YOSHIYUKI MIZOGUCHI, ET AL.

It is certified that error appears in the above-identified patent and that said Letters Patent is hereby corrected as shown below:

COLUMN 14

Line 11, "FIG. 12" should read --FIG. 9--.
Line 12, "FIG. 16A," should read --FIG. 9B--
Line 20, "11" should read --111--.
Line 22, "2104" should read --104--.
Line 25, "108d" should read --108b--.
Line 31, "on" should be deleted.

COLUMN 16

Line 3, "that" should read --as--.
Line 5, "ca" should read --cap--.

COLUMN 17

Line 13, "16A" should read --9B--.
Line 23, "5B" should read --5--.

UNITED STATES PATENT AND TRADEMARK OFFICE

CERTIFICATE OF CORRECTION

PATENT NO. : 4,926,196
DATED : May 15, 1990
INVENTOR(S) : YOSHIYUKI MIZOGUCHI, ET AL.

It is certified that error appears in the above-identified patent and that said Letters Patent is hereby corrected as shown below:

COLUMN 7

Line 51, "second blocks" should read --second cam 108b, the cap 104 to the position where the latter blocks--.
Line 62, "PO." should read --P1.--.

COLUMN 9

Line 37, "flexible head portion 225," should read --flexible head portion 215,--.
Line 61, "22," should read --222,--.

COLUMN 11

Line 60, "S 11," should read --S 111,--.

COLUMN 12

Line 63, "240c" should read --204c--.

COLUMN 13

Line 46, "p inter" should read --printer--.

UNITED STATES PATENT AND TRADEMARK OFFICE
CERTIFICATE OF CORRECTION

PATENT NO. : 4,926,196

DATED : May 15, 1990

INVENTOR(S) : YOSHIYUKI MIZOGUCHI, ET AL.

It is certified that error appears in the above-identified patent and that said Letters Patent is hereby corrected as shown below:

COLUMN 17

Line 66, "means for" should read --means, wherein said driving means is operable in a first mode to connect said capping means with said vacuum generating means for--.

Signed and Sealed this

Third Day of March, 1992

*Attest:*

HARRY F. MANBECK, JR.

*Attesting Officer*

*Commissioner of Patents and Trademarks*